United States Patent
Iwamoto et al.

(10) Patent No.: US 9,250,658 B2
(45) Date of Patent: Feb. 2, 2016

(54) ELECTRONIC APPARATUS

(71) Applicant: Panasonic Corporation, Kadoma-shi, Osaka (JP)

(72) Inventors: Akira Iwamoto, Osaka (JP); Hitoshi Nakatani, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 243 days.

(21) Appl. No.: 14/010,091

(22) Filed: Aug. 26, 2013

(65) Prior Publication Data

US 2014/0063728 A1     Mar. 6, 2014

(30) Foreign Application Priority Data

Aug. 30, 2012  (JP) ................................ 2012-190594
Jul. 26, 2013  (JP) ................................ 2013-155485

(51) Int. Cl.
  *G06F 1/16*    (2006.01)
  *G06F 1/18*    (2006.01)

(52) U.S. Cl.
  CPC .............. *G06F 1/1658* (2013.01); *G06F 1/187* (2013.01)

(58) Field of Classification Search
  CPC ............................... G06F 1/187; G06F 1/1658
  See application file for complete search history.

(56) References Cited

U.S. PATENT DOCUMENTS

| | | | | |
|---|---|---|---|---|
| 5,463,527 A | * | 10/1995 | Hager et al. | 361/679.34 |
| 7,471,509 B1 | * | 12/2008 | Oliver | 361/679.33 |
| 7,639,489 B2 | * | 12/2009 | Miyoshi et al. | 361/679.34 |
| 2002/0043608 A1 | * | 4/2002 | Nakata et al. | 248/560 |
| 2004/0190193 A1 | | 9/2004 | Kuwajima | |
| 2005/0007733 A1 | * | 1/2005 | Byun et al. | 361/685 |
| 2007/0008697 A1 | * | 1/2007 | Choi et al. | 361/685 |
| 2008/0151421 A1 | * | 6/2008 | Asakura et al. | 360/97.02 |
| 2008/0158712 A1 | | 7/2008 | Nakatani | |
| 2008/0280518 A1 | | 11/2008 | Takahashi et al. | |
| 2009/0016013 A1 | * | 1/2009 | Nakamura et al. | 361/685 |
| 2011/0059281 A1 | | 3/2011 | Wada | |

FOREIGN PATENT DOCUMENTS

| | | |
|---|---|---|
| JP | 2001-049211 | 2/2001 |
| JP | 2004-315087 | 11/2004 |
| JP | 2008-280439 | 11/2008 |
| JP | 2008-291986 | 12/2008 |
| JP | 2009-264483 | 11/2009 |
| JP | 2011-057810 | 3/2011 |

* cited by examiner

*Primary Examiner* — Adrian S Wilson
(74) *Attorney, Agent, or Firm* — Hamre, Schumann, Mueller & Larson

(57) ABSTRACT

Buffer materials 7 and a lower principal surface 6a of a hard disk case 6, and the buffer materials 7 and a hard disk drive 5, are adhesively fixed to each other by strong pressure-sensitive adhesive forces. Pressure-sensitive adhesive materials 8 are provided between the hard disk drive 5 and an upper principal surface 6b of the hard disk case 6. The pressure-sensitive adhesive force of each pressure-sensitive adhesive material 8 is weak to such a degree that the pressure-sensitive adhesive material 8 becomes detached by a contraction force of each buffer material 7. Thus, when external disturbance is applied to the hard disk drive 5, each pressure-sensitive adhesive material 8 becomes detached during contraction of each buffer material 7. The contraction of each buffer material 7 and the detachment of each pressure-sensitive adhesive material 8 allow improvement of the impact resistance of the hard disk drive 5.

11 Claims, 20 Drawing Sheets

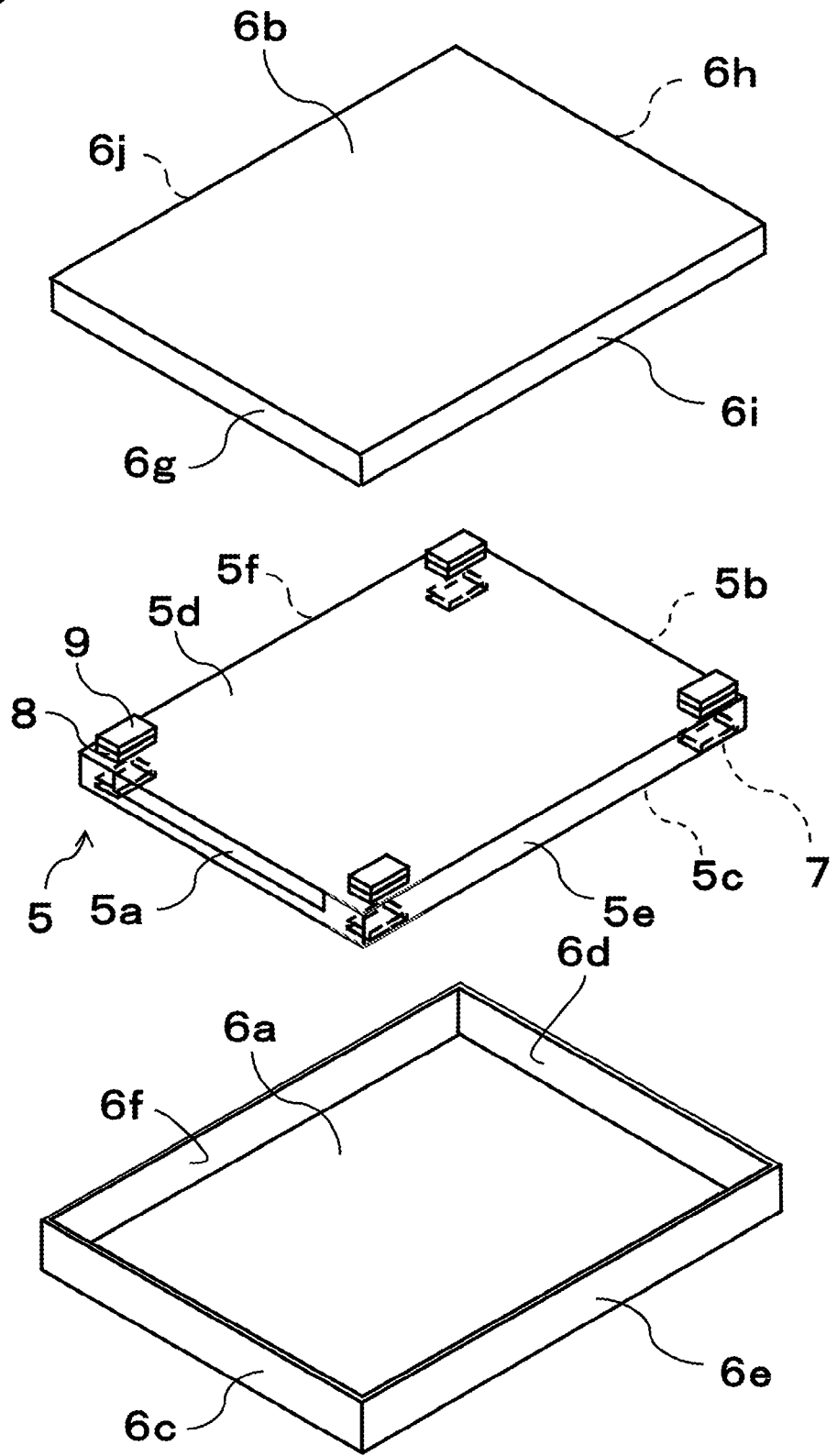

ing part, and the impact absorbing parts are
ELECTRONIC APPARATUS

BACKGROUND

1. Field

The present disclosure relates to an electronic apparatus including a buffer material and a component within a housing.

2. Description of the Related Art

As a buffer member used in an electronic apparatus in this field, for example, Japanese Laid-Open Patent Publication No. 2009-264483 proposes a composite buffer member of an impact absorbing part and a vibration damping part. A notebook personal computer is disclosed in which vibration damping parts are attached to top and bottom surfaces of a hard disk drive, and impact absorbing parts are disposed on top and bottom surfaces of the vibration damping parts so as to be integral therewith, and the impact absorbing parts are stored in a storage part.

When vibration or an impact caused by a drop or the like is applied to the notebook personal computer in the thickness direction of the notebook personal computer, the vibration or the impact propagates from the storage part through the impact absorbing parts and the vibration damping parts to the hard disk drive. The impact is absorbed mainly by the impact absorbing parts, and shaking received by the notebook personal computer or vibration caused by rotation of the hard disk drive or the like is damped mainly by the vibration damping parts. Therefore, it is possible to protect the hard disk drive from the impact and the vibration applied to the notebook personal computer.

SUMMARY

Regarding a notebook personal computer which is carried, it is assumed that vibration is repeatedly applied during transportation, or an impact occurs due to its unexpected drop during installation. Japanese Laid-Open Patent Publication No. 2009-264483 discloses a configuration in which buffer members having the same configuration are attached to top and bottom surfaces of a hard disk drive so as to be plane-symmetrical to each other about the hard disk drive. However, when vibration or an impact caused by a drop is applied, it is assumed that a shift in position between the hard disk drive and each buffer member or a shift in position between each buffer member and the storage part occurs. When such a shift in position occurs, it is impossible to deal with a repeated impact or vibration. Thus, it is necessary to suppress occurrence of such a shift in position.

For that, it is an ordinary way to use an adhesive for fixing the hard disk drive, while keeping the buffering characteristics of each member. Only when the hard disk drive and the members disposed on the top and bottom surfaces of the hard disk drive are fixed to each other by the adhesive and the members and the storage part are fixed to each other by the adhesive, the advantageous effects described in Japanese Laid-Open Patent Publication No. 2009-264483 are exerted. It should be noted that as the adhesive, a material that does not influence the impact absorbing performance and the vibration damping performance of the members is selected and used. However, although the buffering characteristics of the members are kept, the protection performance for a device vulnerable to vibration or an impact, such as the hard disk drive, is changed even by the adhesive force of the adhesive.

The present disclosure provides an electronic apparatus that improves vibration resistance and/or impact resistance of a component provided within a housing thereof.

An electronic apparatus according to the present disclosure includes: a housing; a component disposed within the housing; a first buffer member disposed between a first surface of an inside of the housing and the component; a second surface, of the inside of the housing, opposed to the first surface across the component; and a pressure-sensitive adhesive material disposed between the component and the second surface for positioning the component and the second surface. The pressure-sensitive adhesive material becomes detached when the first buffer member contracts such that a thickness of the first buffer member becomes a post-contraction length T4 from a natural length T1 (T1>T4).

The configuration of the present disclosure allows improvement of the impact resistance of the electronic apparatus including the component.

BRIEF DESCRIPTION OF THE DRAWINGS

FIG. 5 is a principal part exploded perspective view of another hard disk case;

DETAILED DESCRIPTION

Hereinafter, an embodiment will be described in detail with reference to the drawings as appropriate. However, there will be instances in which detailed description beyond what is necessary is omitted. For example, detailed description of subject matter that is previously well-known, as well as redundant description of components that are substantially the same will in some cases be omitted. This is to prevent the following description from being unnecessarily lengthy, in order to facilitate understanding by a person of ordinary skill in the art.

The inventors provide the following description and the accompanying drawings in order to allow a person of ordinary skill in the art to sufficiently understand the present disclosure, and the description and the drawings are not intended to restrict the subject matter of the scope of the patent claims.

In the present embodiment, a description will be given with a notebook personal computer (hereinafter, abbreviated as PC) as an example of an electronic apparatus and with a hard disk drive (hereinafter, abbreviated as HDD) as an example of a component. Other examples of the electronic apparatus include a camera integral with a video, a game apparatus, and a terminal used outdoor. In addition, other examples of the component include an optical disk drive, a camera which captures a still image and a moving image, and an antenna which transmits and receives signals to and from an external apparatus via radio waves.

[Configuration of PC]

Figure 1:
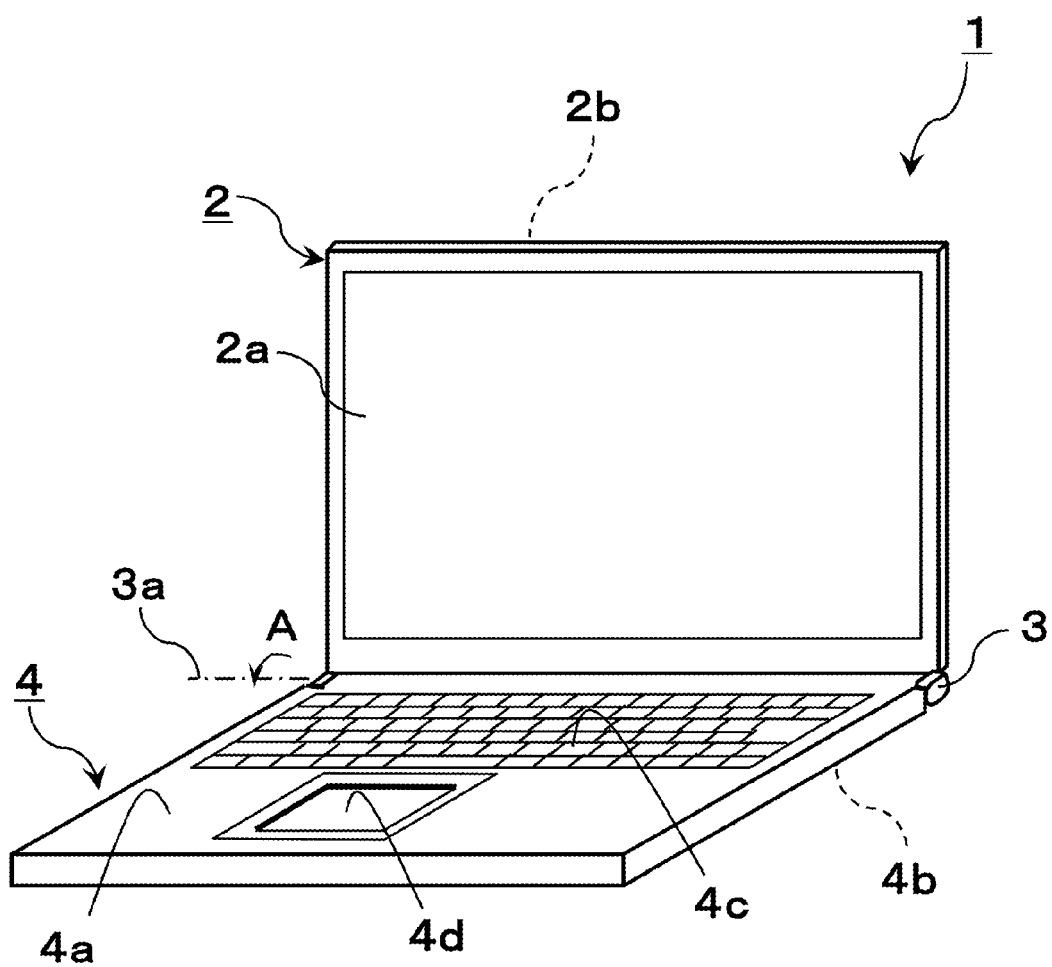
FIG. 1 is a perspective view showing an opened state of a personal computer.

FIG. 1 is a perspective view showing the external appearance of the PC 1 according to the present embodiment. In the PC 1, a display housing 2 including a display panel 2a and an operation housing 4 having a front surface 4a and a reverse surface 4b are supported by a hinge mechanism 3 having a rotation axis 3a, so as to be openable and closeable. A keyboard 4c and an operation pad 4d for operating visual signals and the like displayed on the display panel 2a are disposed in the front surface 4a. A circuit board for converting an input signal from an operation section such as the keyboard 4c to a visual signal or the like, an adapter terminal for causing the circuit board to run by commercial power, a signal terminal for inputting and outputting a signal from and to an external apparatus, an antenna for performing wireless communication, an optical disk drive, and the like are also provided within the operation housing 4, but these components are omitted in the drawings.

Figure 2:
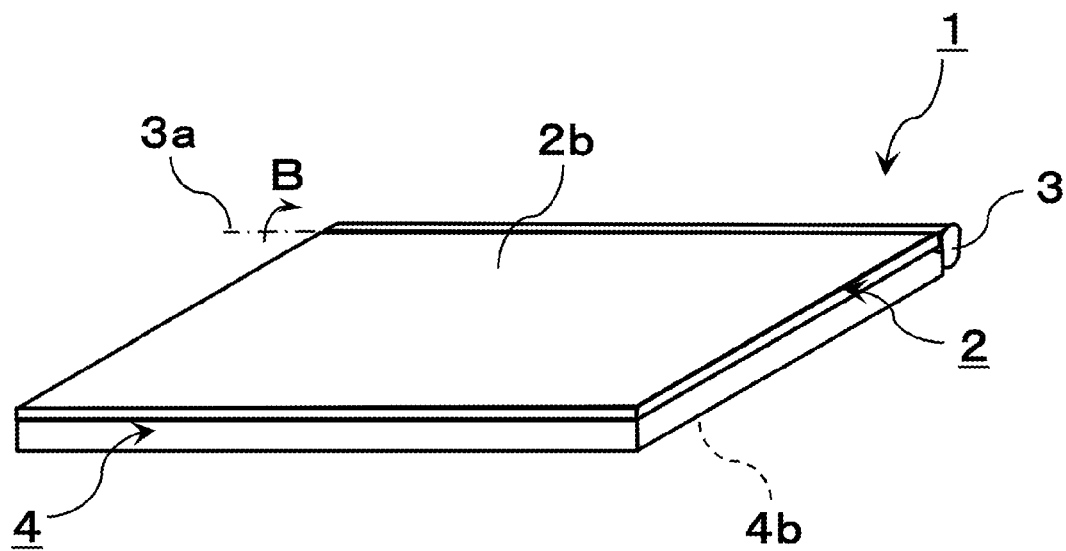
FIG. 2 is a perspective view showing a closed state of the personal computer.

When the hinge mechanism 3 in FIG. 1 is rotated about the rotation axis 3a in the direction of an arrow A, the PC 1 goes into a closed state where the display panel 2a of the display housing 2 faces the front surface 4a of the operation housing 4 as shown in FIG. 2. In addition, when the display housing 2 is rotated about the rotation axis 3a in the direction of an arrow B from the closed state, the PC 1 shifts to an opened state shown in FIG. 1.

[1-1. Configuration of Hard Disk Case]

Figure 3:
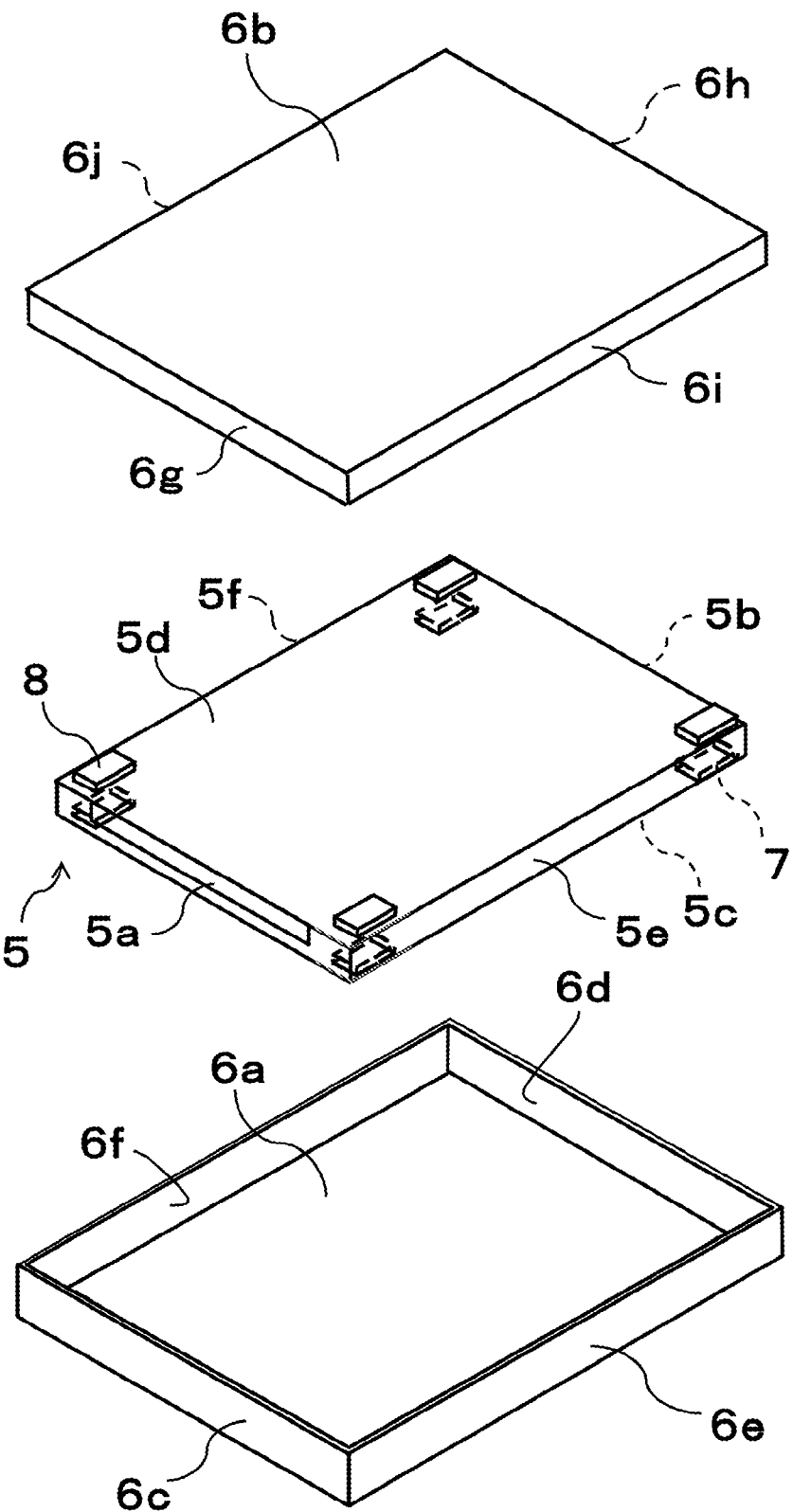
FIG. 3 is a principal part exploded perspective view of a hard disk case.

A HDD 5 stored in a hard disk case (hereinafter, abbreviated as case) 6 is also provided within the operation housing 4 of the PC 1. The case 6 is stored in a storage part (described later) formed, for example, at the reverse surface 4b, a lateral surface, or the like of the operation housing 4. FIG. 3 shows an exploded perspective view of the case 6. The HDD 5 includes an electrode 5a connected electrically to a head which sends and receives information to and from the disk stored therein, an opposing lateral surface 5b opposed to the electrode 5a across the disk and the head, a bottom surface 5c on a lower principal surface 6a side of the case 6 in the HDD 5, a top surface 5d opposed to the bottom surface 5c across the disk and the head, a right lateral surface 5e on the right side as viewed from the electrode 5a, and a left lateral surface 5f opposed to the right lateral surface 5e. In addition, the case 6 storing the HDD 5 therein has a lower principal surface 6a to which the bottom surface 5c is close, an upper principal surface 6b to which the top surface 5d is close, an electrode lower lateral surface 6c of the lateral surfaces of the lower principal surface 6a to which the electrode 5a is close, an opposing lower lateral surface 6d opposed to the electrode lower lateral surface 6c across the HDD 5, a right-side lower lateral surface 6e and a left-side lower lateral surface 6f which are lateral surfaces located on the right side and the left side, respectively, when being viewed from the electrode lower lateral surface 6c, an electrode upper lateral surface 6g, of lateral surfaces on the upper principal surface 6b side, to which the electrode 5a is close, an opposing upper lateral surface 6h opposed to the electrode upper lateral surface 6g across the HDD 5, and a right-side upper lateral surface 6i and a left-side upper lateral surface 6j which are lateral surfaces located on the right side and the left side, respectively, when being viewed from the electrode upper lateral surface 6g.

Four buffer materials 7 independent of each other are disposed between the bottom surface 5c of the HDD 5 and the lower principal surface 6a of the case 6 at the respective corners of the bottom surface 5c. In other words, each buffer material 7 is an example of a first buffer member. In addition, four pressure-sensitive adhesive materials 8 independent of each other are disposed between the top surface 5d of the HDD 5 and the upper principal surface 6b of the case 6 at the respective corners of the top surface 5d. Each buffer material 7 and the lower principal surface 6a, and each buffer material 7 and the bottom surface 5c, are fixed to each other, for example, by an adhesive having such an adhesive force that the adhesive does not become detached even when an impact caused by a drop of the PC 1 is applied thereto, and vibration caused by an impact applied to the HDD 5 is lessened by a reciprocating motion of the buffer material 7 caused by stretching and contraction of the buffer material 7. The adhesive force between the bottom surface 5c of the lower principal surface 6a and each buffer material 7 is referred to as a strong adhesive force. Meanwhile, either each pressure-sensitive adhesive material 8 and the upper principal surface 6b or each pressure-sensitive adhesive material 8 and the top surface 5d become detached from each other by contraction of each buffer material 7. The adhesive force between each pressure-sensitive adhesive material 8 and either the upper principal surface 6b or the top surface 5d which become detached from each other by the contraction of each buffer material 7 is referred to as a weak pressure-sensitive adhesive force.

Examples of each of the adhesive that bonds each buffer material 7 and the lower principal surface 6a and the bottom surface 5c together with the strong adhesive force and the pressure-sensitive adhesive materials 8 which bond the upper principal surface 6b and the top surface 5d together with the weak pressure-sensitive adhesive force include acrylic type, rubber type, polyester type, and urethane type, and each of the strong adhesive force and the weak pressure-sensitive adhesive force is evaluated, for example, as a peel adhesive force (its unit is N/cm) with a stainless plate as an adherend. In the present embodiment, as each of the adhesive and the pressure-sensitive adhesive materials (hereinafter, the adhesive and the pressure-sensitive adhesive materials are referred to as pressure-sensitive adhesive materials) 8, an acrylic type adhesive material is used.

[1-2. Buffering Action for HDD]

Figure 4A:
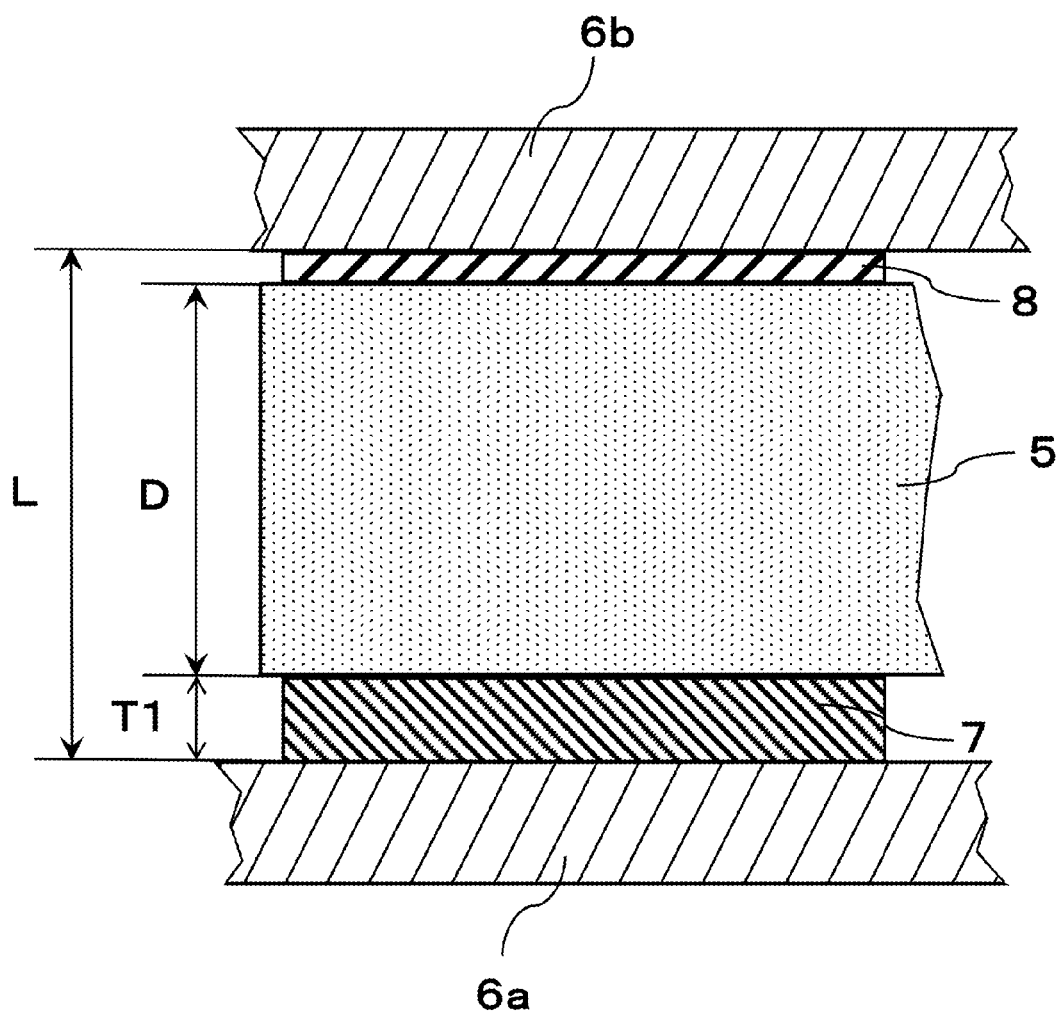
FIG. 4A is a principal part cross-sectional view prior to application of external disturbance to the hard disk drive.

FIG. 4A is an enlarged cross-sectional view around the HDD 5 in a state where the PC 1 is placed in a stationary manner, for example, on a flat surface. It should be noted that when a user carries the PC 1 or places the PC 1 on a desk or the like, vibration or shaking (hereinafter, referred to as impact unless otherwise specified) caused by unexpected contact with a foreign matter, an impact, and/or a drop (hereinafter, referred to as external disturbance) may be applied to the PC 1. The buffer materials 7 and the pressure-sensitive adhesive materials 8 disposed on the HDD 5 lessen an impact caused by external disturbance applied to the PC 1. In the present embodiment, each buffer material 7 will be described with, as T1, its thickness when the PC 1 is placed in a stationary manner on a desk or the like. Therefore, each buffer material 7 has a natural length longer than the thickness T1 by a length corresponding to the weight of the HDD 5. Each buffer material 7 is adhesively fixed to the lower principal surface 6a and the HDD 5 by the strong pressure-sensitive adhesive material, and thus positioned.

It should be noted that the thickness of the strong pressure-sensitive adhesive material which adhesively fixes the lower principal surface 6a and each buffer material 7 to each other and the bottom surface 5c (see FIG. 3) and each buffer material 7 to each other is small to such a degree that the thickness can be neglected as compared to the thickness D of the HDD 5 and the thickness T1 of each buffer material 7. Thus, this thickness is not illustrated, and is unchanged even when external disturbance is applied. In addition, the thickness of each pressure-sensitive adhesive material 8 which weakly bonds the HDD 5 and the upper principal surface 6b together is also small to such a degree that the thickness can be neglected as compared to the thickness D of the HDD 5 and the thickness T1 of each buffer material 7, and thus this thickness is unchanged before and after detachment of the pressure-sensitive adhesive material 8 when external disturbance is applied. Moreover, even when external disturbance is applied to the PC 1, a gap L in the storage part and the thickness D of the HDD 5 are unchanged. Therefore, the pressure-sensitive adhesive materials 8, the HDD 5, and the buffer materials 7 are positioned and stored in the gap L between the lower principal surface 6a and the upper principal surface 6b of the case 6.

When external disturbance C1 is applied to the PC 1 in a direction from the bottom surface 5c of the HDD 5 (in a direction from the pressure-sensitive adhesive material 8 to the buffer material 7), the buffer material 7 contracts in response to the external disturbance C1 such that its thickness becomes T3 (T3<T1). A force resisting the thickness change ΔT1 (T1−T3) caused by the contraction of the buffer material 7 becomes the weak pressure-sensitive adhesive force of the pressure-sensitive adhesive material 8. Here, if ΔT1 is within a range less than the weak pressure-sensitive adhesive force of the pressure-sensitive adhesive material 8, it is possible to absorb the thickness change ΔT1 of the buffer material 7, and a state shown in FIG. 4A is kept.

Figure 4B:
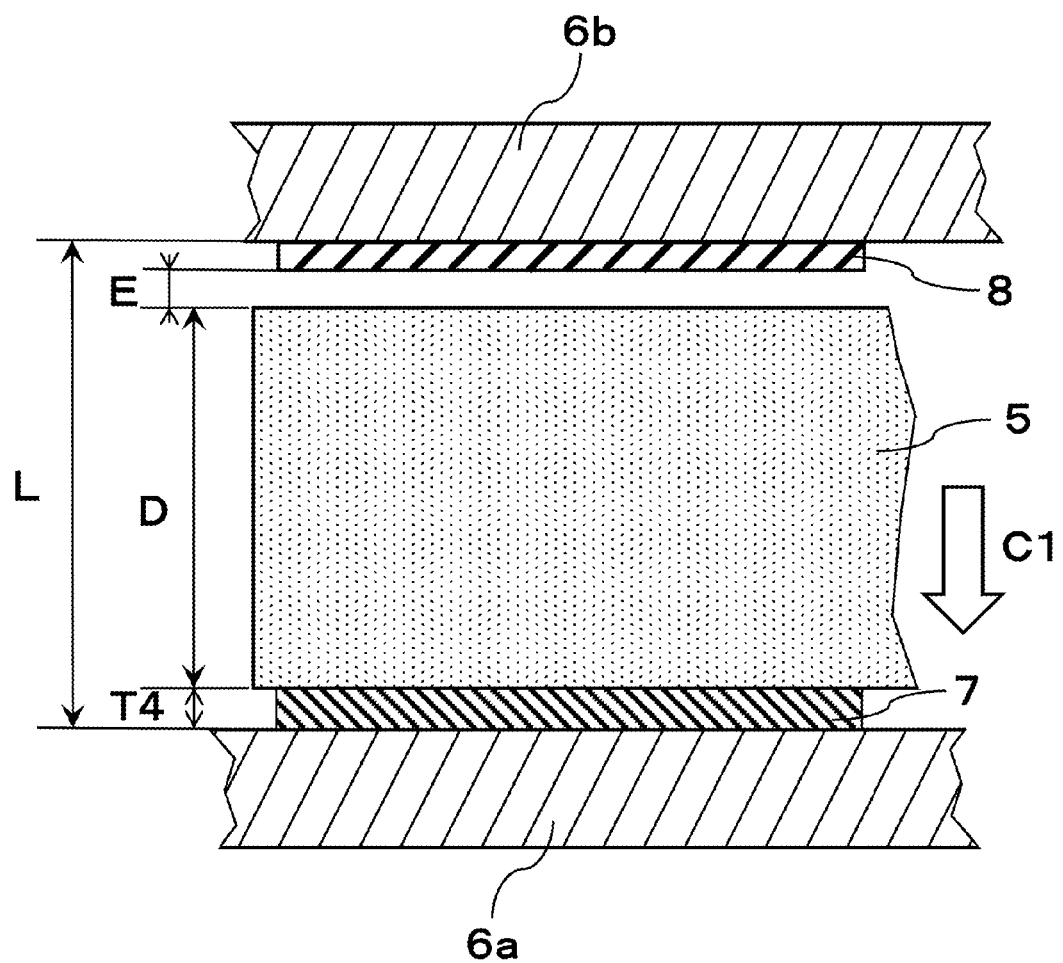
FIG. 4B is a principal part cross-sectional view of a state where external disturbance is applied to the hard disk drive.

In addition, when the external disturbance C1 applied to the PC 1 is equal to or greater than the weak pressure-sensitive adhesive force of the pressure-sensitive adhesive material 8, the HDD 5 and the pressure-sensitive adhesive material 8 become detached from each other at the interface therebetween as shown in FIG. 4B. In other words, at the instant when the external disturbance C1 is applied, the thickness of the buffer material 7 becomes T4 (T4<T1), and the weak pressure-sensitive adhesive force of the pressure-sensitive adhesive material 8 serves to absorb the contraction force of each buffer material 7 by ΔT1. At that time, when the weak pressure-sensitive adhesive force of the pressure-sensitive adhesive material 8 is equal to or greater than an impact caused by the external disturbance C1, the HDD 5 and the pressure-sensitive adhesive material 8 become detached from each other at the interface therebetween by a gap E (T1−T4). In the next instant, the thickness of the buffer material 7 returns to T1 by the restoring force of the buffer material 7, thereby resulting in the state in FIG. 4A. When the external disturbance C1 is applied, the weak pressure-sensitive adhesive force of the pressure-sensitive adhesive material 8 acts in a direction opposite to the direction in which the buffer material 7 contracts, so as to keep the HDD 5 in its original state (i.e., a state shown in FIG. 4A) during contraction of the buffer material 7, whereby energy loss is caused in the impact and it is possible to lessen the impact applied to the HDD 5.

Figure 4C:
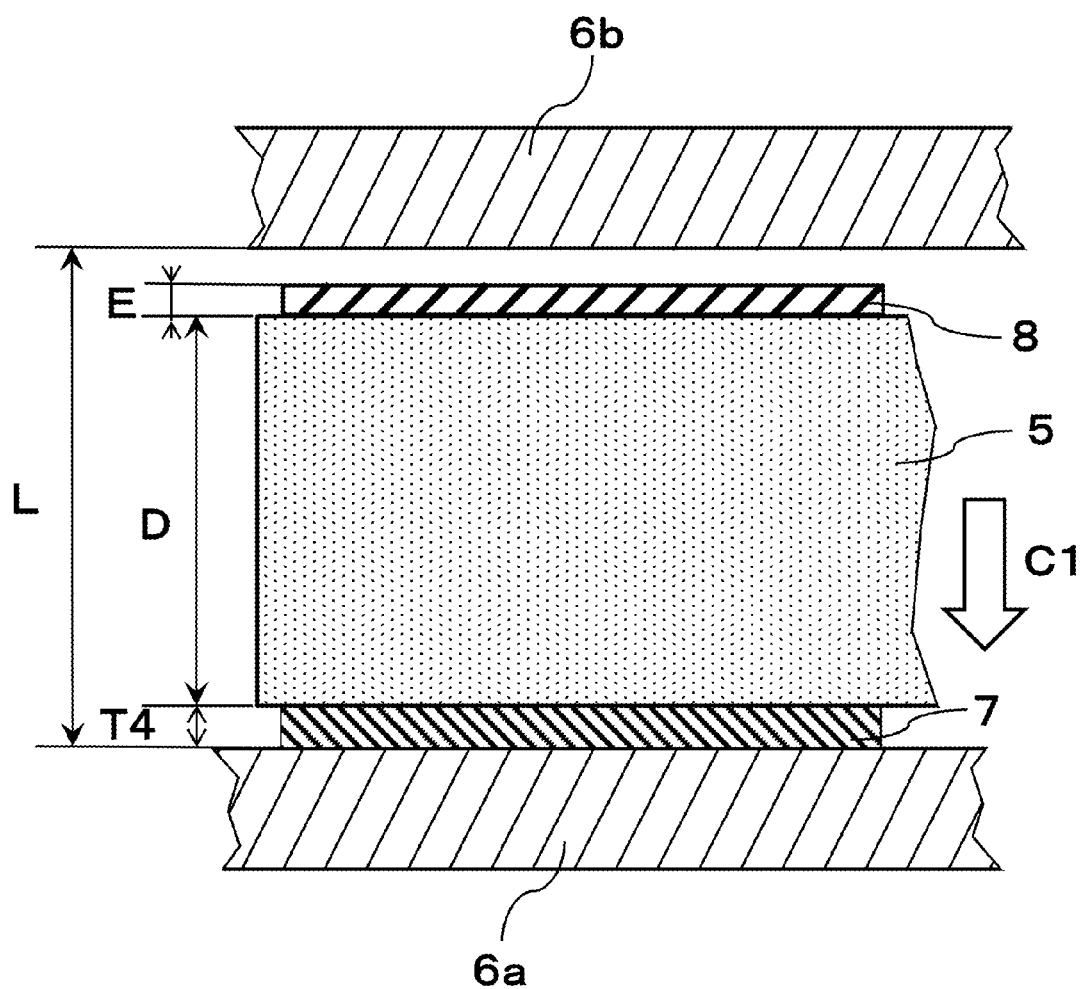
FIG. 4C is a principal part cross-sectional view of a state where external disturbance is applied to the hard disk drive.

It should be noted that because of the weak pressure-sensitive adhesive force of each pressure-sensitive adhesive material 8, the HDD 5 and the pressure-sensitive adhesive material 8 may become detached from each other at the interface therebetween as shown in FIG. 4B and/or the upper principal surface 6b and the pressure-sensitive adhesive material 8 may become detached from each other at the interface therebetween as shown in FIG. 4C.

In addition, when the HDD 5 returns by the restoration of the buffer material 7 from the instant of detachment shown in FIG. 4B or FIG. 4C, it is possible to return to the state shown in FIG. 4A since the weak pressure-sensitive adhesive force of the pressure-sensitive adhesive material 8 has re-adhesiveness. Examples of the weak pressure-sensitive adhesive material having re-adhesiveness are described, for example, in Japanese Laid-Open Patent Publication Nos. 2001-049211, 2008-280439, and 2011-057810, and are also applicable to the present embodiment in a fundamental idea.

In the present embodiment, the areas of each pressure-sensitive adhesive material 8 and each buffer material 9 are the same, but a configuration where either one of the areas is changed is also applicable to the present embodiment. In other words, since each of the adhesive force of the adhesive and the pressure-sensitive adhesive force of each pressure-sensitive adhesive material 8 is proportional to the area of the interface, for example, when either one of the areas is changed, it is possible to adjust the performance of alleviating an impact by each pressure-sensitive adhesive material 8.

It should be noted that examples of a material that can be used for each buffer material 7 include expanded bodies obtained by expanding urethane, ethylene-propylene rubber, fluorocarbon rubber, polyethylene, and the like.

In addition, each buffer material 7 is made of a single material, but, for example, a composite buffer material of an impact absorbing part and a vibration damping part disclosed in Japanese Laid-Open Patent Publication No. 2009-264483, and a composite buffer material which is disclosed in Japanese Laid-Open Patent Publication No. 2004-315087 or 2008-291986 and in which a cut end surface of a plate-like member is buried in a flexible material, etc. can also be used as each buffer material 7 in the present embodiment.

It should be noted that examples of the adhesive applied between the lower principal surface 6a and the bottom surface 5c and each buffer material 7 include acrylic type, rubber type, polyester type, and urethane type. In the present embodiment, an acrylic type adhesive is used.

[2-1. Configuration of Hard Disk Case]

FIG. 5 is an exploded perspective view of a case 6 and a HDD 5 stored in the case 6. It should be noted the configurations of the case 6 and the HDD 5 are the same as those in the embodiment described above with reference to FIG. 3, and the description thereof is omitted.

Figure 6A:
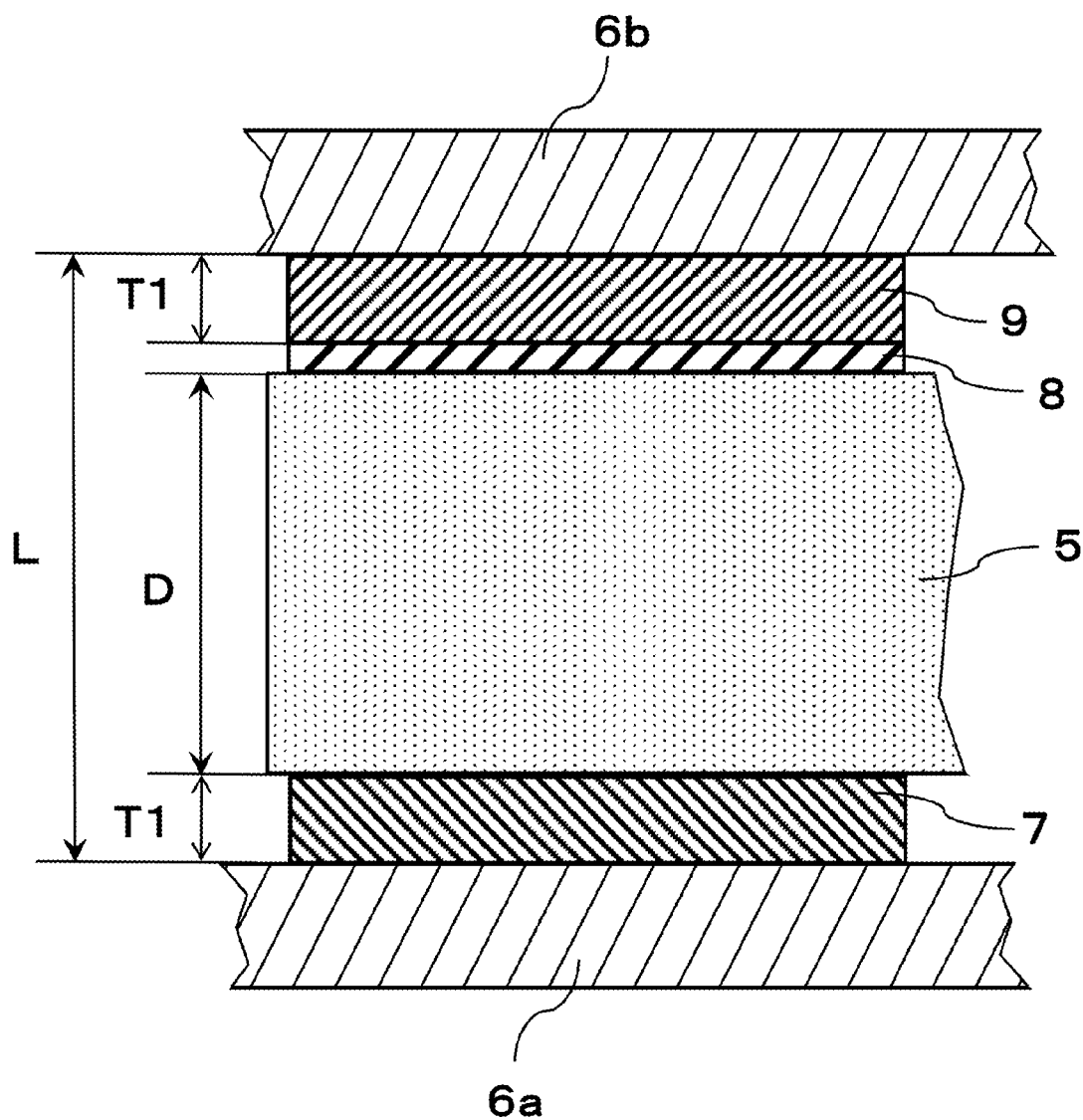
FIG. 6A is a principal part cross-sectional view prior to application of external disturbance to the hard disk drive.

In addition, similarly to the above-described embodiment, buffer materials 7 on both surfaces of which a strong pressure-sensitive adhesive material is provided are disposed on the bottom surface 5c of the HDD 5, and pressure-sensitive adhesive materials 8 having weak pressure-sensitive adhesiveness on both surfaces thereof are disposed on the top surface 5d of the HDD 5. An upper buffer material 9 is interposed between each pressure-sensitive adhesive material 8 and the upper principal surface 6b. In other words, each upper buffer material 9 is an example of a second buffer member. That is, the above pressure-sensitive adhesive material 8 is interposed between each upper buffer material 9 and the HDD 5, and each upper buffer material 9 and the upper principal surface 6b are adhesively fixed to each other by a strong pressure-sensitive adhesive material. Examples of materials that can be used for each buffer material 7 and each upper buffer material 9 include expanded bodies obtained by expanding urethane, ethylene-propylene rubber, fluorocarbon rubber, polyethylene, and the like. In the present embodiment, an expanded urethane sheet having a density of 60 kg/m$^3$, a tensile strength of 250 KPa, and an elongation of 150% is used. In addition, the outer shape of each of each buffer material 8 and each lower buffer material 9 has a width of 15 mm in the left-right direction of the sheet of FIG. 6A and a length of 10 mm in the up-down direction of the sheet. It should be noted that as shown in FIG. 6A, the thickness of each of each buffer material 7 and each upper buffer material 9 is 2 mm in a state where the PC 1 is placed in a stationary manner on a desk. In other words, the weight of the HDD 5 is applied to each buffer material 7, and elongation corresponding to the weight of the HDD 5 is applied to each upper buffer material 9.

[2-2. Buffering Action for HDD]

FIG. 6A is an enlarged cross-sectional view around the HDD 5 in a state where the PC 1 is placed in a stationary manner, for example, on a flat surface or the like. As described above, each buffer material 7 is positioned by being adhesively fixed to the lower principal surface 6a and the HDD 5 by the strong pressure-sensitive adhesive material, and each upper buffer material 9 is adhesively fixed to the upper principal surface 6b by a strong pressure-sensitive adhesive material and is weakly bonded to the HDD 5 by the pressure-sensitive adhesive material 8. It should be noted that the thickness of the strong pressure-sensitive adhesive material is small to such a degree that the thickness can be neglected as compared to the thickness D of the HDD 5 and the thicknesses of each upper buffer material 9 and each buffer material 7. Thus, this thickness is not illustrated, and is unchanged even when external disturbance is applied. In addition, the thickness of each pressure-sensitive adhesive material 8 is originally small to such a degree that the thickness can be neglected similarly to the strong pressure-sensitive adhesive material. However, this thickness is illustrated for showing which surface becomes detached. Therefore, the upper buffer materials 9, the HDD 5, and the buffer materials 7 are positioned and stored in the gap L between the upper principal surface 6b and the lower principal surface 6a of the case 6. In addition, even when external disturbance is applied to the PC 1, the gap L in the case 6 and the thickness D of the HDD 5 are unchanged.

Figure 6B:
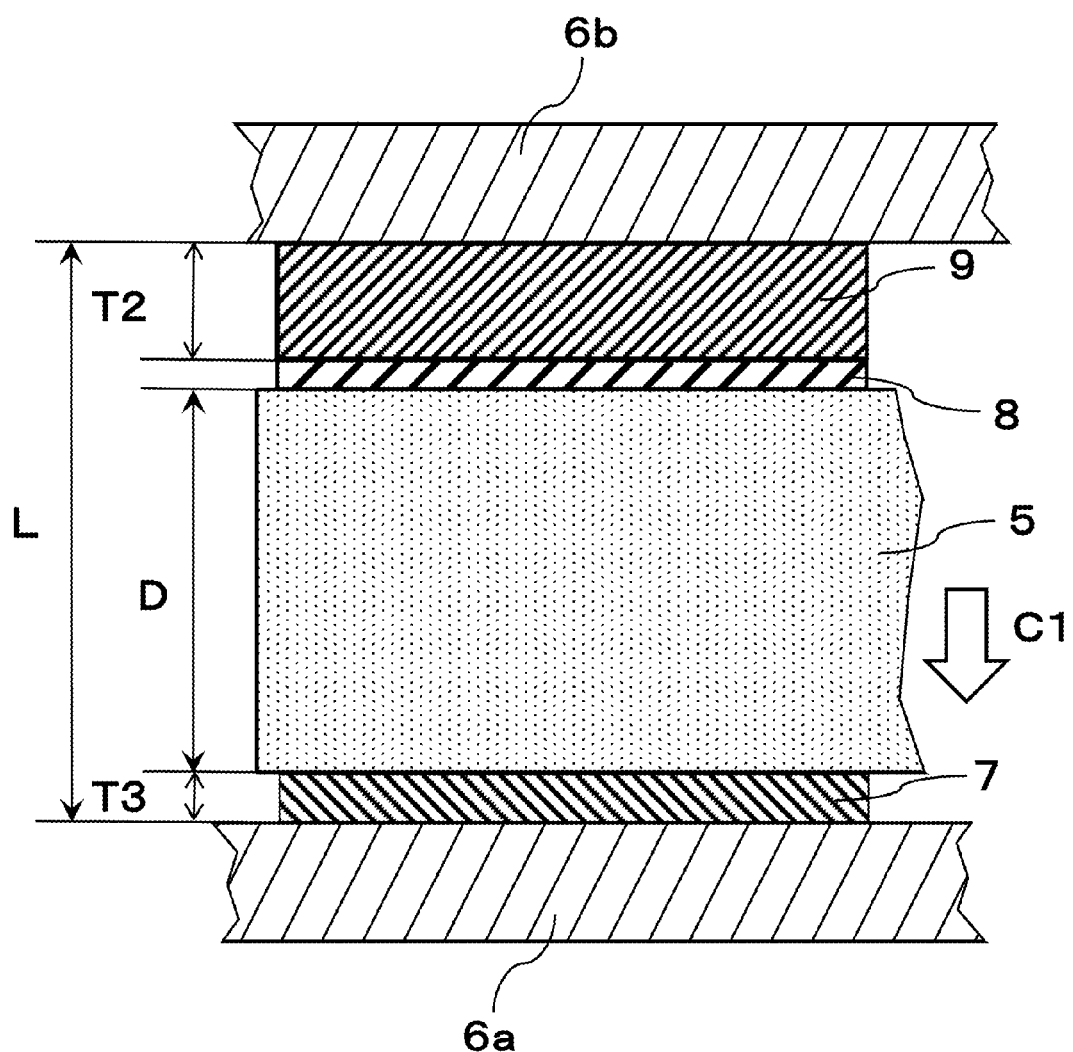
FIG. 6B is a principal part cross-sectional view of a state where external disturbance is applied to the hard disk drive.

When the external disturbance C1 is applied to the PC 1 in a direction from the bottom surface 5c of the HDD 5 (in a direction from the upper buffer material 9 to the buffer material 7), the buffer material 7 contracts in response to the external disturbance C1 such that its thickness becomes T3 (T3<T1) as shown in FIG. 6B. Here, if the pressure-sensitive adhesive force of the pressure-sensitive adhesive material 8 is equal to or less than the restoring force of the upper buffer material 9, the thickness change $\Delta T1$ (T1−T3) caused by the contraction of the lower buffer material 7 results in a thickness T2 (T2=T1+$\Delta T1$) of the upper buffer material 9 that has stretched. Here, if $\Delta T1$ is within a range less than a buffer limit length F that is a buffer enable length of the upper buffer material 9 in the stretching direction (a length at which it is possible to absorb the external disturbance C1 only with stretching of the upper buffer material 9 without causing detachment of the pressure-sensitive adhesive material), it is possible to absorb the external disturbance C1 by the buffering effect of the upper buffer material 9 as shown in FIG. 6B.

Figure 6C:
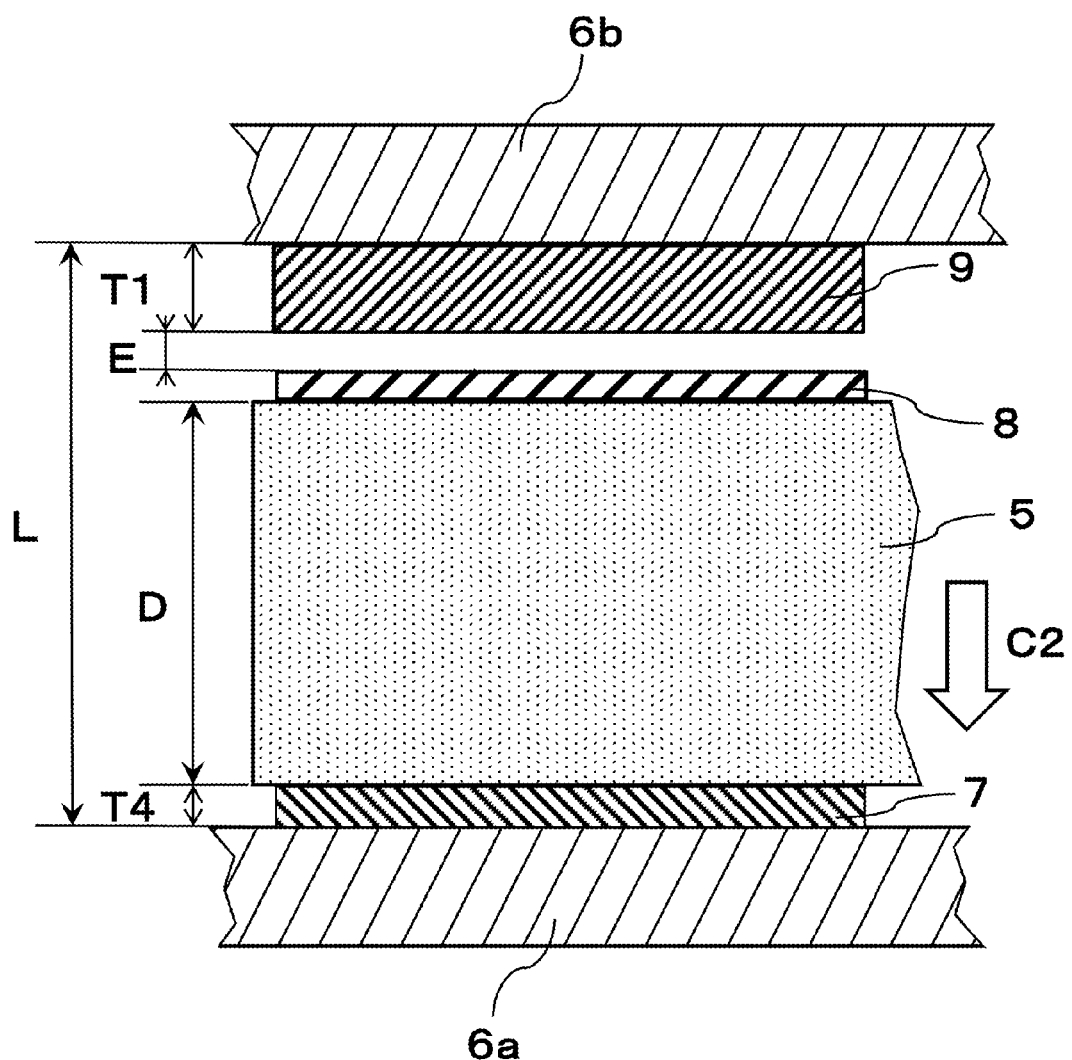
FIG. 6C is a principal part cross-sectional view of a state where external disturbance is applied to the hard disk drive.

Next, when external disturbance C2 (C2>C1) is further applied to the PC 1, at the instant when the external disturbance C2 is applied, the thickness of the buffer material 7 becomes T4 (T4=T3−$\Delta T2$) and the upper buffer material 9 exerts a restoring force corresponding to $\Delta T1+\Delta T2$. Here, a buffer enable length (a compressible length) of the buffer material 7 in the stretching direction is equal to or longer than (T1−T4). However, the pressure-sensitive adhesive material 8, which bonds the upper buffer material 9 and the HDD 5 together, actually becomes detached at its interface with the upper buffer material 9 as shown in FIG. 6C, and thus the thickness of the upper buffer material 9 becomes the original thickness T1 (the thickness of the upper buffer material 9 strictly becomes a natural length slightly larger than T1 since the upper buffer material 9 is press-fitted between the lower principal surface 6a and the upper principal surface 6b in a state of FIG. 6A). It should be noted that FIG. 6C shows an instant when the pressure-sensitive adhesive material 8 and the upper buffer material 9 become detached from each other. As a result, a void E ($\Delta T1+\Delta T2$) is provided between the upper buffer material 9 and the pressure-sensitive adhesive material 8. In other words, weak pressure-sensitive adhesiveness that is adhesiveness and pressure-sensitive adhesiveness (hereinafter, the adhesiveness and the pressure-sensitive adhesiveness are referred to as pressure-sensitive adhesiveness) weak as compared to that of the other strong adhesive is provided between the upper buffer material 9 and the pressure-sensitive adhesive material 8, and the pressure-sensitive adhesive force of the weak pressure-sensitive adhesiveness allows the void E to occur between the upper buffer material 9 and the pressure-sensitive adhesive material 8, thereby achieving lessening of the external disturbance. The pressure-sensitive adhesive material 8 having the weak pressure-sensitive adhesiveness at its interface with the upper buffer material 9 absorbs the external disturbance C2 which is attributable to a detachment force causing the void E to occur and is applied to the HDD 5 (in other words, the PC 1). As describe above, when the upper buffer material 9 becomes detached from the pressure-sensitive adhesive material 8, it is possible to lessen an impact caused when the external disturbance C2 is applied (hereinafter, referred to as an initial impact) with the weak pressure-sensitive adhesive force of the pressure-sensitive adhesive material 8. It should be noted that the weak pressure-sensitive adhesiveness is such that, for example, in the present embodiment, the buffer material 7 contracts by external disturbance applied to the HDD 5 and the pressure-sensitive adhesive surface becomes detached by the weight of the HDD 5 and the contraction force of the buffer material 7.

It should be noted that a reaction against the external disturbance C2 applied to the PC 1 is applied after the HDD 5 is moved downward, and thus vibration is applied in the upward direction. At that time, a restoring force of the buffer material 7 by (T1−T4) is applied to the HDD 5, and thus the HDD 5 returns to the state of FIG. 6A via the state of FIG. 6B. By repeating the states shown in FIGS. 6A to 6C, it is possible to lessen an impact applied to the HDD 5 by the buffer material 7 (hereinafter, referred to as a delay impact).

In addition, in returning from the state of FIG. 6C to the state of FIG. 6B, the pressure-sensitive adhesive material 8 and the upper buffer material 9 are adherent to each other based on the re-adhesiveness of the pressure-sensitive adhesive material 8. Examples of the weak pressure-sensitive adhesive material having the re-adhesiveness are described, for example, in Japanese Laid-Open Patent Publication Nos. 2001-049211, 2008-280439, and 2011-057810, and are also applicable to the present embodiment in a fundamental idea.

Figure 6D:
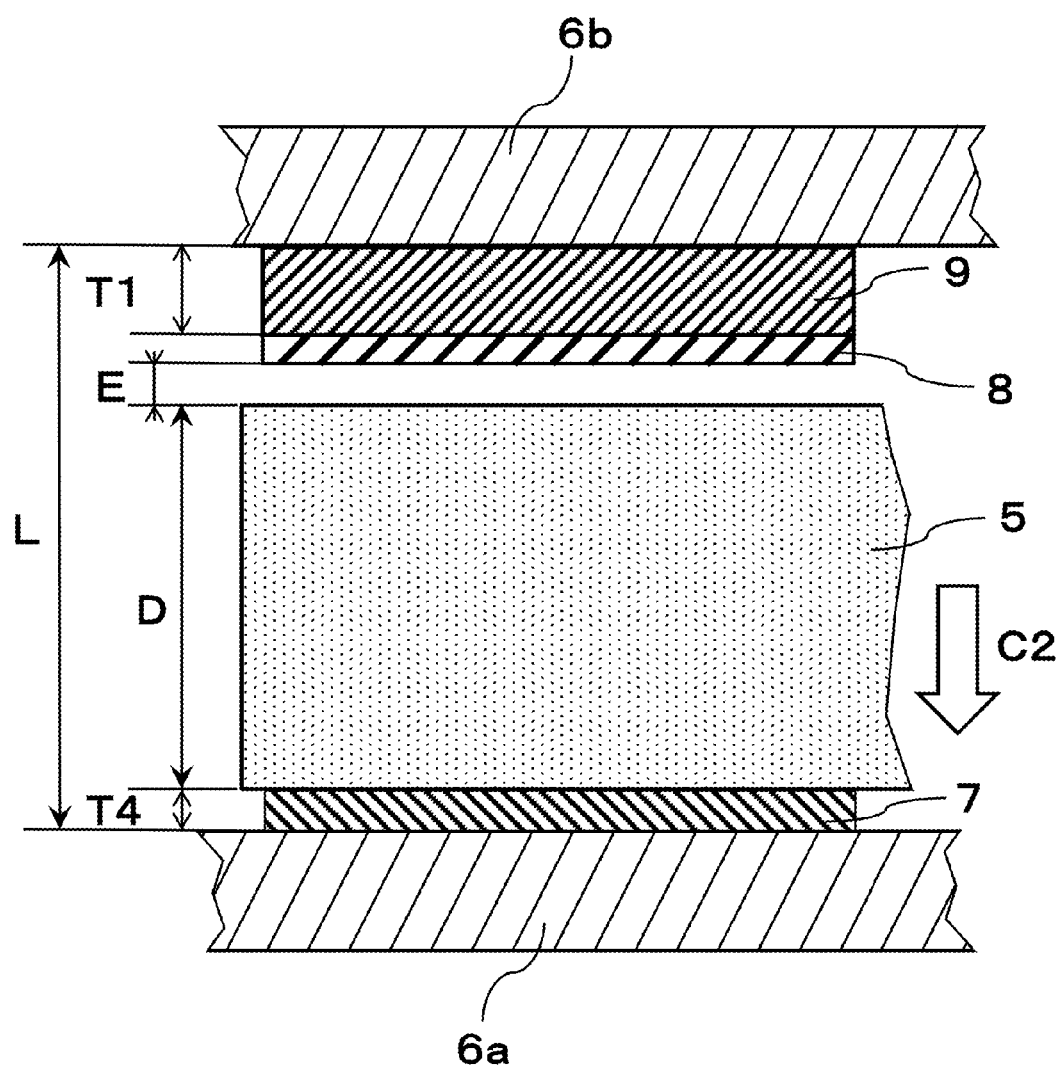
FIG. 6D is a principal part cross-sectional view of a state where external disturbance is applied to the hard disk drive.

It should be noted that the description has been given in which the above pressure-sensitive adhesive material 8 becomes detached at its interface joined to the upper buffer material 9. However, for example, the pressure-sensitive adhesive material 8 becomes detached at its interface joined to the HDD 5 as shown in FIG. 6D. Furthermore, the pressure-sensitive adhesive material 8 may be provided between the upper buffer material 9 and the upper principal surface 6*b*, and may become detached at the interface between the pressure-sensitive adhesive material 8 and the upper buffer material 9 and/or at the interface between the pressure-sensitive adhesive material 8 and the top surface 5*d*. In other words, when an upper buffer material 9-1 and another upper buffer material 9-2 are disposed adjacently between the upper principal surface 6*b* and the top surface 5*d*, for example, detachment may occur at the interface between the pressure-sensitive adhesive material 8 and the upper buffer material 9-1 (FIG. 6C), and at the other upper buffer material 9-2, detachment may occur at the interface between the pressure-sensitive adhesive material 8 and the top surface 5*d* (FIG. 6D).

Figure 6E:
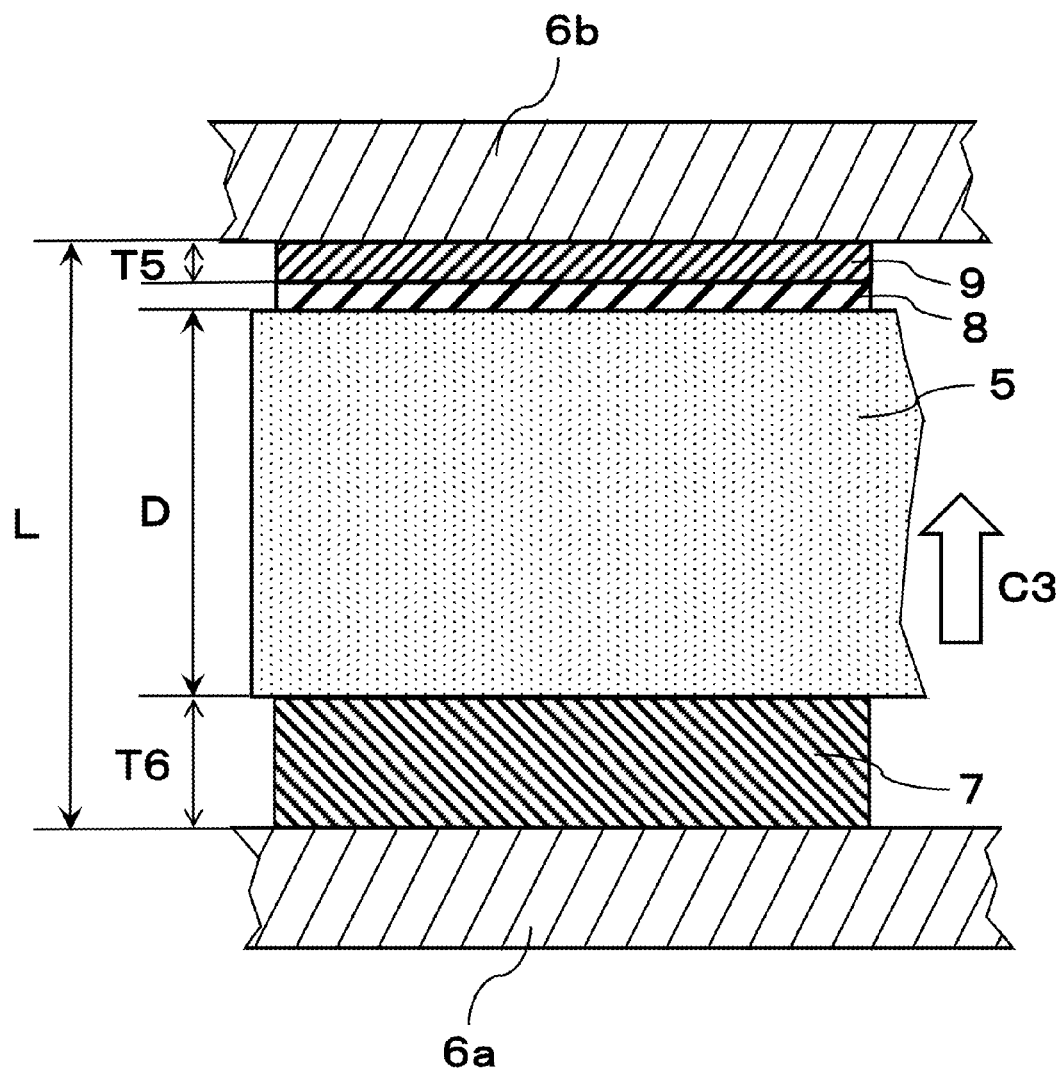
FIG. 6E is a principal part cross-sectional view of a state where external disturbance is applied to the hard disk drive.

It should be noted that a reaction against the external disturbance C2 applied to the PC 1 is applied after the HDD 5 is moved downward, and vibration is applied in the upward direction as shown in FIG. 6E. At that time, a restoring force of the buffer material 7 by (T1−T4) is applied to the HDD 5, and thus the HDD 5 shifts to the state of FIG. 6E via the state of FIG. 6B and the state of FIG. 6A. By repeating the states shown in FIGS. 6A to 6E, it is possible to lessen an impact applied to the HDD 5 by the buffer material 7 (hereinafter, referred to as a delay impact).

The buffering effect on the external disturbance (C2–C3) in the present embodiment is caused by composite action of the upper buffer material 9, the buffer material 7 and the pressure-sensitive adhesive material 8 having the weak pressure-sensitive adhesiveness. In other words, in the case where the upper buffer material 9 and the buffer material 7 are disposed, lessening of external disturbance applied to the HDD 5 can be divided into initial impact lessening and delay impact lessening subsequent to the initial impact lessening. That is, when external disturbance is plotted as impact acceleration (G) against elapsed time, the initial impact lessening is dependent on a rising gradient and a peak value of the external disturbance, and the delay impact lessening is dependent on an integral quantity of the impact acceleration relative to time change. It has been found that the impact lessening performance of the upper buffer material 9 and the buffer material 7 is effective for the delay impact lessening but less contributes to the initial impact lessening. Since the pressure-sensitive adhesive material 8, which bonds the upper buffer material 9 and the HDD 5 together, is configured to have weak pressure-sensitive adhesiveness in the present embodiment, the lessening of the external disturbance can be divided into a peak of the initial impact lessening occurring at an short elapsed time and a peak of the delay impact lessening subsequent to the peak of the initial impact lessening which peak occurs at a long elapsed time, in terms of the relationship between the impact acceleration and the elapsed time described above. The peak height of the initial impact lessening can be controlled by adjusting the re-adhesive force in re-adhering and/or a force at start of detachment against the weak pressure-sensitive adhesiveness between the upper buffer material 9 and the HDD 5. In addition, the amplitude and/or the length of the time of the delay impact lessening is determined by the lessening performance of the upper buffer material 9 and the buffer material 7, and the delay impact lessening can be controlled by the materials and the volumes of these buffer materials.

In addition, in the present embodiment, the thicknesses and the areas of each upper buffer material 9 and each buffer material 7 are the same, but a configuration where either the thicknesses or the areas of each upper buffer material 9 and each buffer material 7 are changed is also applicable to the present embodiment. For example, when either the thicknesses or the areas of each upper buffer material 9 and each buffer material 7 are changed and the same material is used for each upper buffer material 9 and each buffer material 7, it is possible to make the buffering effect of each upper buffer material 9 lower than that of each buffer material 7 by making at least either the thickness or the area of each upper buffer material 9 smaller than that of each buffer material 7. Furthermore, the materials used for each upper buffer material 9 and each buffer material 7 may be changed. In other words, in this case, for example, the buffering ability of each upper buffer material 9 is made lower than that of each buffer material 7.

It should be noted that examples of materials that can be used as each upper buffer material 9 and each buffer material 7 include expanded bodies obtained by expanding urethane, ethylene-propylene rubber, fluorocarbon rubber, polyethylene, and the like.

In addition, each of each upper buffer material 9 and each buffer material 7 in the present embodiment is made of a single material, but, for example, a composite buffer material of an impact absorbing part and a vibration damping part disclosed in Japanese Laid-Open Patent Publication No. 2009-264483, and a composite buffer material which is disclosed in Japanese Laid-Open Patent Publication No. 2004-315087 or 2008-291986 and in which a cut end surface of a plate-like member is buried in a flexible material, etc. can also be used as each upper buffer material 9 and each buffer material 7.

In addition, as a method for changing the materials used for each upper buffer material 9 and each buffer material 7, the buffering performance of each upper buffer material 9 may be made lower than that of each buffer material 7. For example, there are a method of making the expansion ratio of each upper buffer material 9 lower than that of each buffer material 7 to produce a difference in hardness per unit volume therebetween, and a method of making the expansion density of each buffer material 7 higher than that of each upper buffer material 9.

Examples of a pressure-sensitive adhesive material used as the strong pressure-sensitive adhesive material used in the present embodiment include acrylic type, rubber type, polyester type, and urethane type. In the present embodiment, an acrylic type pressure-sensitive adhesive material is used.

[3-1. Configuration of HDD Storage Part]

Figure 7:
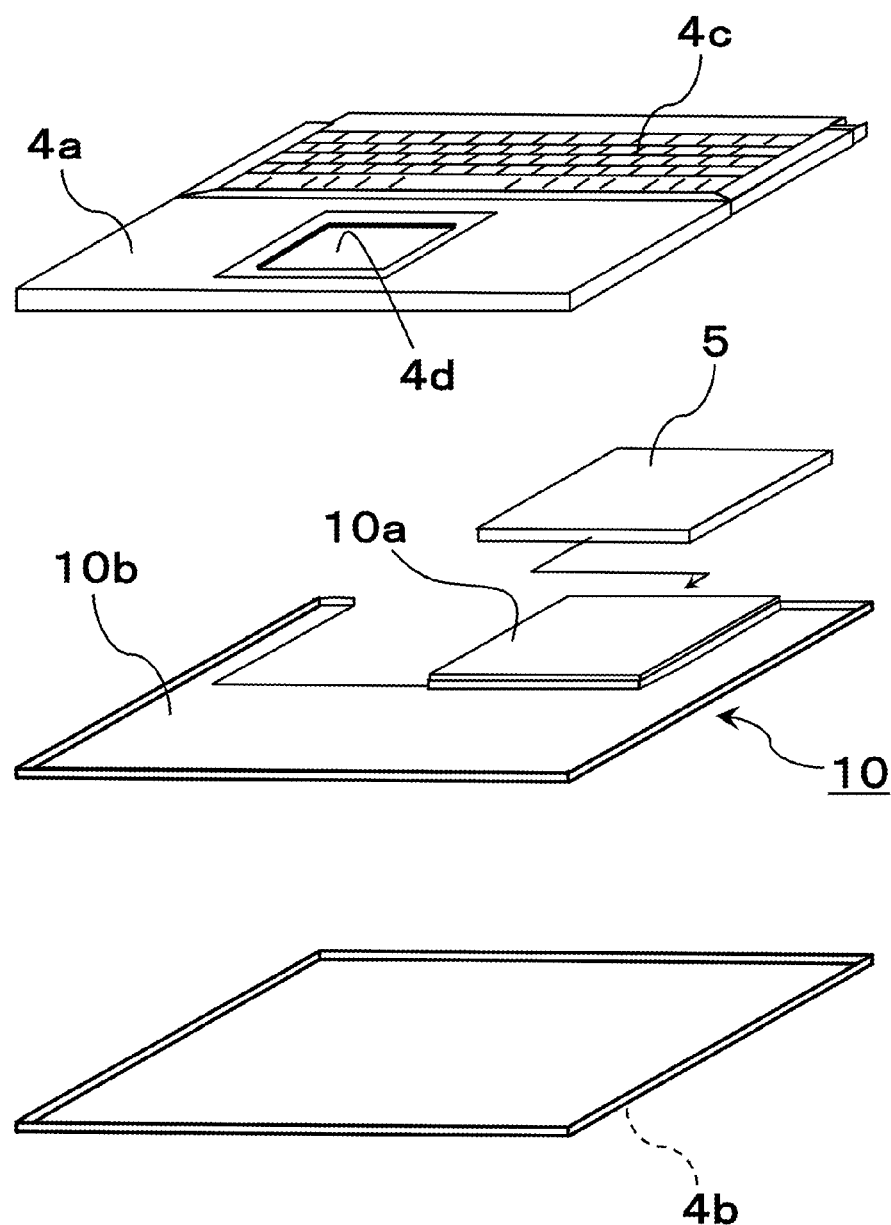
FIG. 7 is a principal part exploded perspective view of an operation housing in another personal computer.

FIG. 7 is a principal part exploded perspective view of an operation housing 4. The operation housing 4 includes an intermediate housing 10*a* between a front surface 4*a* and a reverse surface 4*b*. The intermediate housing 10 includes an upper wall 10*a* and a partition portion 10*b*. Four lateral walls of the square upper wall 10*a*, together with the partition portion 10*b*, form a storage part.

Figure 8:
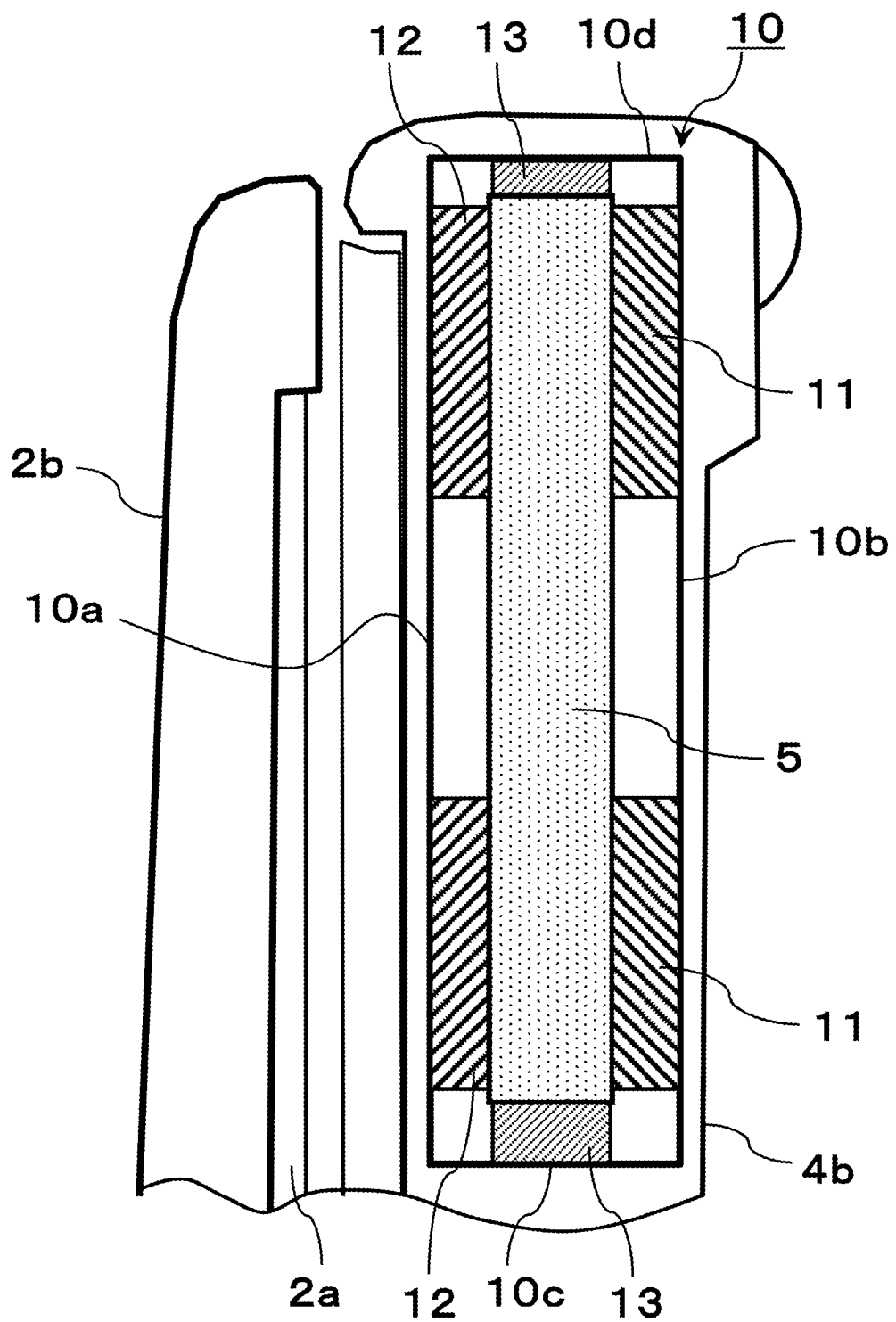
FIG. 8 is a principal part cross-sectional view of the personal computer.

FIG. 8 is a principal part cross-sectional side view of a PC 1. In the PC 1, the HDD 5, which is a device vulnerable to external disturbance, is provided within the storage part. The storage part is formed by the above intermediate housing 10 and includes an upper wall 10*a*, a partition portion 10*b*, and lateral walls 10*c* and 10*d*. Therefore, the upper wall 10*a* and the partition portion 10*b* are the upper wall 10*a* and the partition portion 10b in FIG. 7. In addition, when the PC 1 is assembled, the front surface 4a is fixed to the reverse surface 4b via the intermediate housing 10, thereby providing an operation interior for storing therein, for example, a circuit board for sending and receiving signals to and from the HDD 5. An upper buffer configuration 12 is disposed between the upper wall 10a and the HDD 5, and a lower buffer configuration 11 is disposed between the partition portion 10b and the HDD 5. In other words, the lower buffer configuration 11 is an example of a first buffer member, and the upper buffer configuration 12 is an example of a second buffer member. In the present embodiment, an example will be described in which the upper buffer configuration 12 and the lower buffer configuration 11 have the same thickness and the same length as shown. It should be noted that external disturbance is applied to the PC 1 not only in the up-down direction of the HDD 5 but also in the left-right direction of the HDD 5, and thus lateral buffer materials 13 are disposed between the lateral walls 10c and 10d and the HDD 5.

In addition, since external disturbance is repeatedly applied to the PC 1, the upper buffer configuration 12 and the lower buffer configuration 11 are positioned by a double-sided pressure-sensitive adhesive material having pressure-sensitive adhesiveness on each surface thereof, in order to prevent occurrence of a shift in the position of the upper buffer configuration 12 or the lower buffer configuration 11. In other words, as described later, an upper buffer material 12a and the upper wall 10a are positioned relative to each other via a double-sided pressure-sensitive adhesive material 12c, the upper buffer material 12a and the HDD 5 are positioned relative to each other via a double-sided pressure-sensitive adhesive material 12b, a lower buffer material 11a and the partition portion 10b are positioned relative to each other via a double-sided pressure-sensitive adhesive material 11c, and the lower buffer material 11a and the HDD 5 are positioned relative to each other via a double-sided pressure-sensitive adhesive material 11b. It should be noted that the double-sided pressure-sensitive adhesive materials 11b, 11c, 12b, and 12c will be described in detail with reference to FIGS. 9A to 9D.

[3-2. Buffering Action for HDD]

Figure 9A:
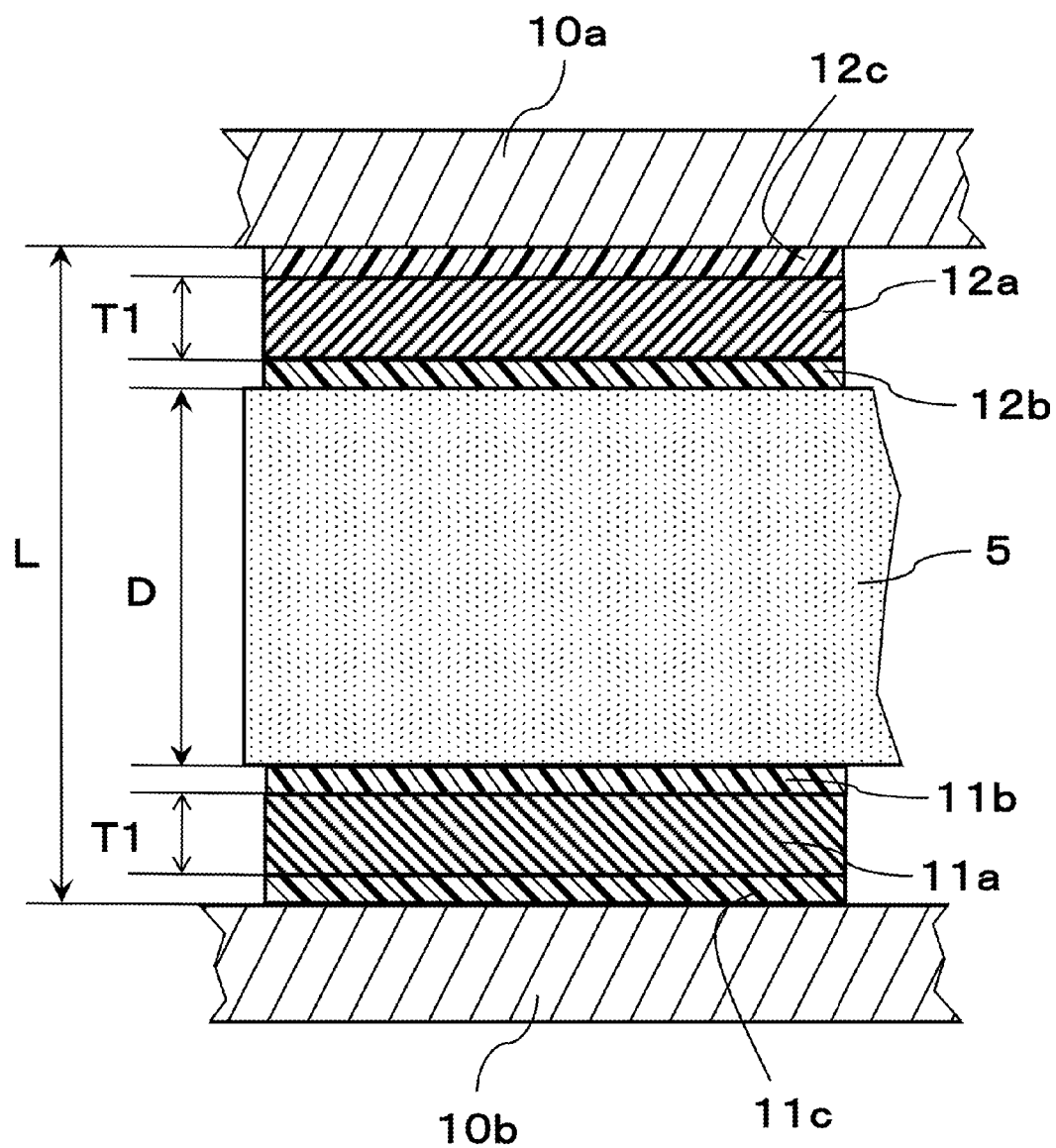
FIG. 9A is a principal part cross-sectional view prior to application of external disturbance to the hard disk drive.

FIG. 9A is an enlarged cross-sectional view around the HDD 5 in a state where the PC 1 is placed in a stationary manner, for example, on a flat surface or the like. In the present embodiment, a description will be given in which the thicknesses of the upper buffer material 12a and the lower buffer material 11a, which buffer external disturbance to the HDD 5 are the same as T1. It should be noted that the upper buffer material 12a is pulled downward by the weight of the HDD 5, and the lower buffer material 11a is pressed by the weight of the HDD 5. Thus, even though their lengths in the thickness direction in FIG. 9A are the same as T1, the original natural length of the upper buffer material 12a is shorter than T1, and the original natural length of the lower buffer material 11a is longer than T1. The upper buffer material 12a is positioned relative to the upper wall 10a by the double-sided pressure-sensitive adhesive material 12c, and is positioned relative to the HDD 5 by the double-sided pressure-sensitive adhesive material 12b. The lower buffer material 11a is positioned relative to the partition portion 10b by the double-sided pressure-sensitive adhesive material 11c, and is positioned relative to the HDD 5 by the double-sided pressure-sensitive adhesive material 11b. It should be noted that each of the thicknesses of the double-sided pressure-sensitive adhesive material 11b, 11c, 12b, and 12c is small to such a degree that the thickness can be neglected as compared to the thickness D of the HDD 5 and the thicknesses T1 of the upper buffer material 12a and the lower buffer material 11a, and thus these thicknesses are unchanged even when external disturbance is applied. In addition, the upper buffer material 12a, the HDD 5, and the lower buffer material 11a are positioned and stored in the gap L between the upper wall 10a and the partition portion 10b in the storage part for the HDD 5. Even when external disturbance is applied to the PC 1, the gap L in the storage part and the thickness D of the HDD 5 are unchanged.

Figure 9B:
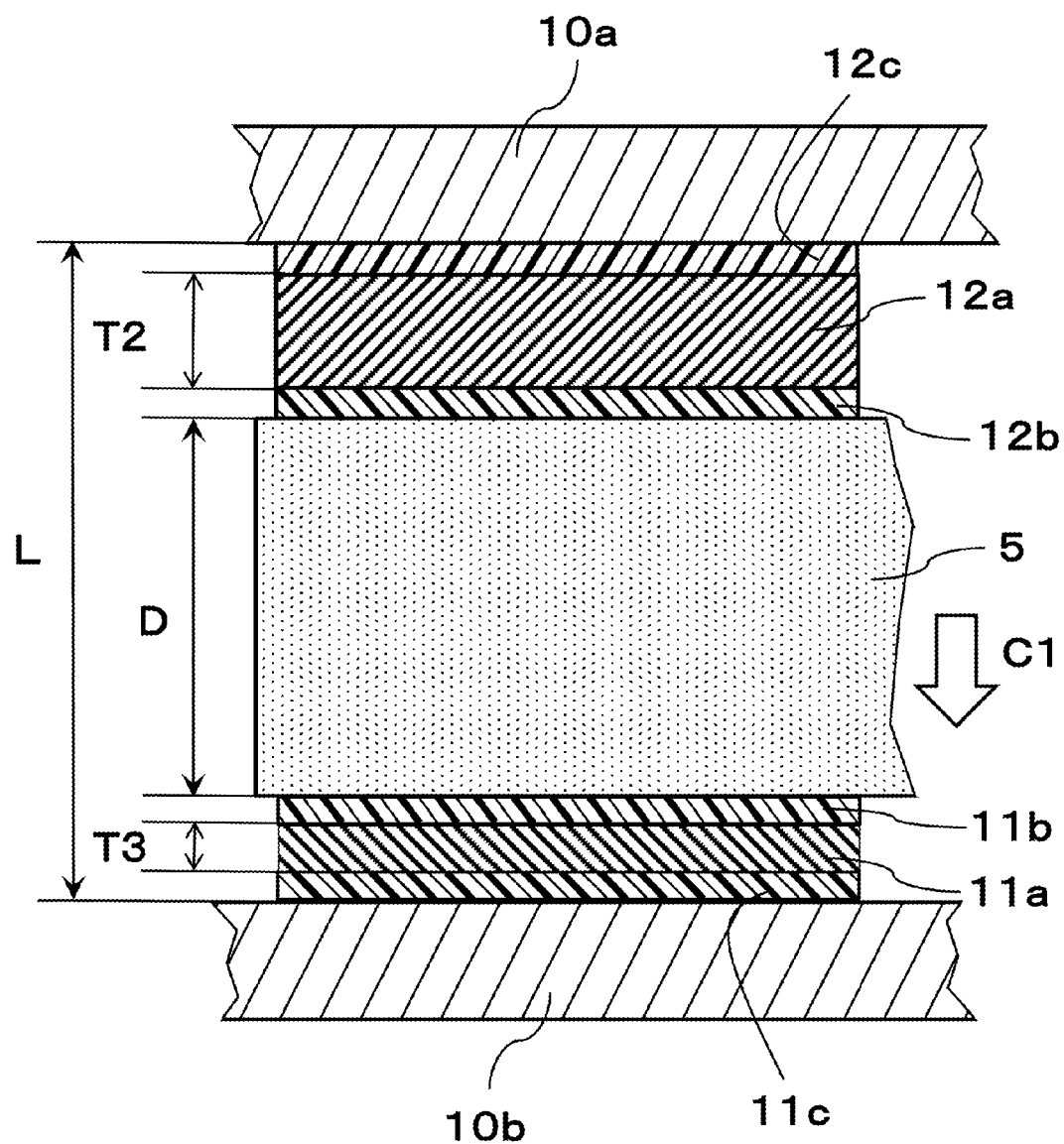
FIG. 9B is a principal part cross-sectional view of a state where external disturbance is applied to the hard disk drive.

When external disturbance C1 is applied to the PC 1 in a direction from the bottom surface 5c (in a direction from the upper buffer material 12a to the lower buffer material 11a), the upper buffer material 12a contracts in response to the external disturbance C1 such that its thickness becomes T3 (T3<T1) as shown in FIG. 9B. The thickness change ΔT1 (T1−T3) by the contraction of the lower buffer material 11a results in a thickness T2 (T2=T1+ΔT1) of the upper buffer material 12a that has stretched. Here, if ΔT1 is within a range less than a buffer limit length F of the upper buffer material 12a, it is possible to absorb the external disturbance C1 by the buffering effect of the upper buffer material 12a as shown in FIG. 9B. It should be noted that the thickness change ΔT1 influences, as repulsion, the upper buffer material 12a in addition to the buffering properties of the single lower buffer material 11a. However, here, attention is paid to the fact that the thickness change ΔT1 of the lower buffer material 11a appears as a phenomenon. This also follows a description below.

Figure 9C:
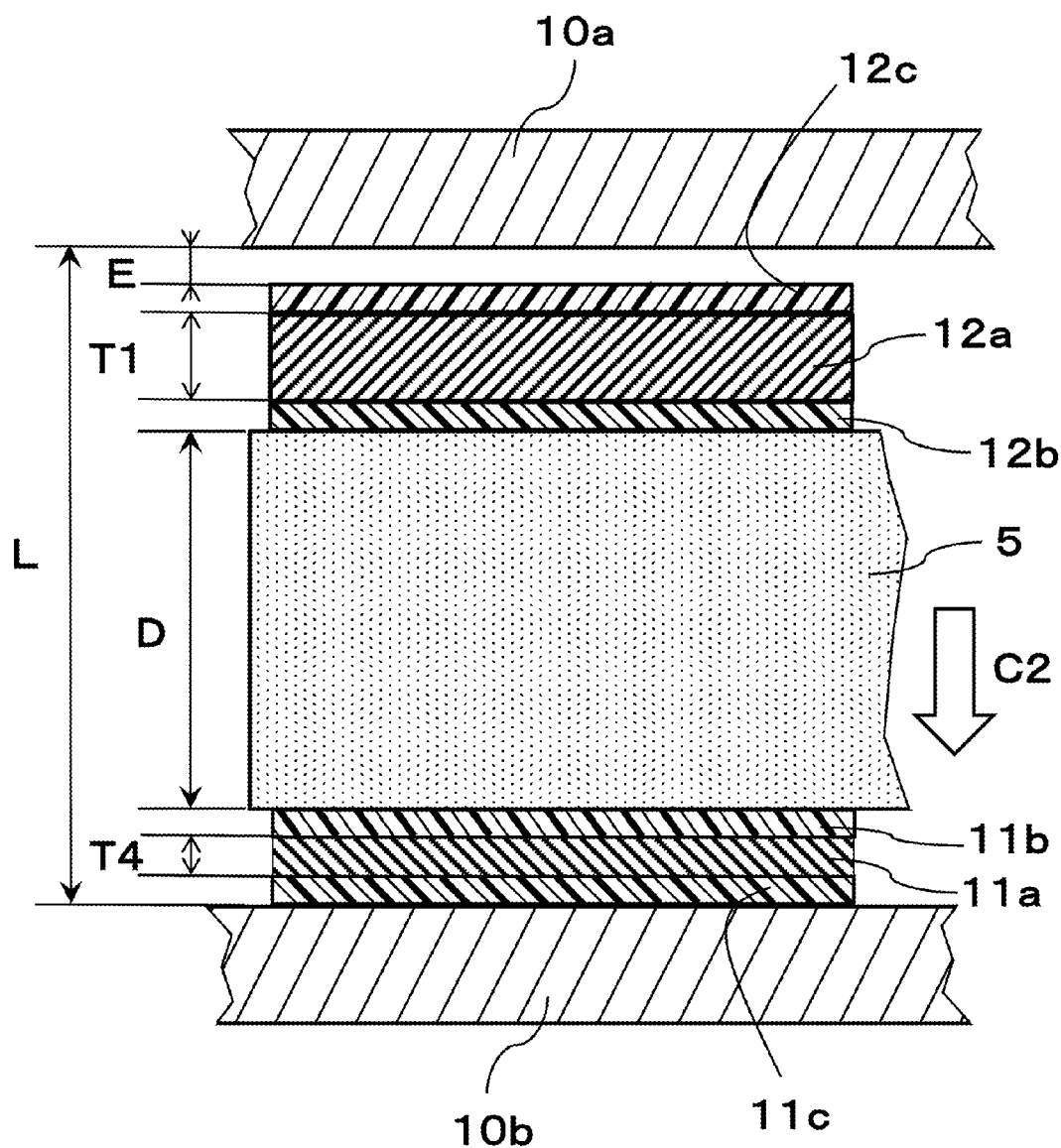
FIG. 9C is a principal part cross-sectional view of a state where external disturbance is applied to the hard disk drive.

Next, when external disturbance C2 (C2>C1) is further applied to the PC 1, at the instant when the external disturbance C2 is applied, the thickness of the lower buffer material 11a becomes T4 (T4=T3−ΔT2) and the upper buffer material 12a exerts a restoring force corresponding to ΔT1+ΔT2 as shown in FIG. 9C. At that time, if the change in the thickness of the upper buffer material 12a becomes the buffer limit length F (F≤ΔT1+ΔT2), the double-sided pressure-sensitive adhesive material 12c, which positions the upper buffer material 12a relative to the upper wall 10a, becomes detached at its interface with the upper wall 10a, and the thickness of the upper buffer material 12a becomes the natural length T1. As a result, a void E (ΔT1+ΔT2) is provided between the upper buffer material 12a and the upper wall 10a. In other words, the double-sided pressure-sensitive adhesive material 12c, which positions the upper buffer material 12a relative to the upper wall 10a, has weak pressure-sensitive adhesiveness whose adhesive force is weak as compared to the other double-sided pressure-sensitive adhesive materials 12b, 11b, and 11c. As a result, if the pressure-sensitive adhesive force of the weak pressure-sensitive adhesiveness exceeds the buffer limit length F of the upper buffer material 12a, the void E occurs, thereby achieving lessening of the external disturbance. The pressure-sensitive adhesive material 12c having the weak pressure-sensitive adhesiveness at its interfaces with the upper buffer material 12a and the upper wall 10a absorbs the external disturbance C2 which is attributable to a detachment force causing the void E to occur and is applied to the HDD 5 (in other words, the PC 1). Thus, when the double-sided pressure-sensitive adhesive material 12c becomes detached from the upper wall 10a, it is possible to lessen an initial impact (its details will be described later) caused when the external disturbance C2 is applied. It should be noted that the weak pressure-sensitive adhesiveness is such that, for example, in the present embodiment, the lower buffer material 11a contracts by external disturbance applied to the HDD 5 and the pressure-sensitive adhesive surface becomes detached by the weight of the HDD 5 and the contraction force of the lower buffer material 11a.

Figure 9D:
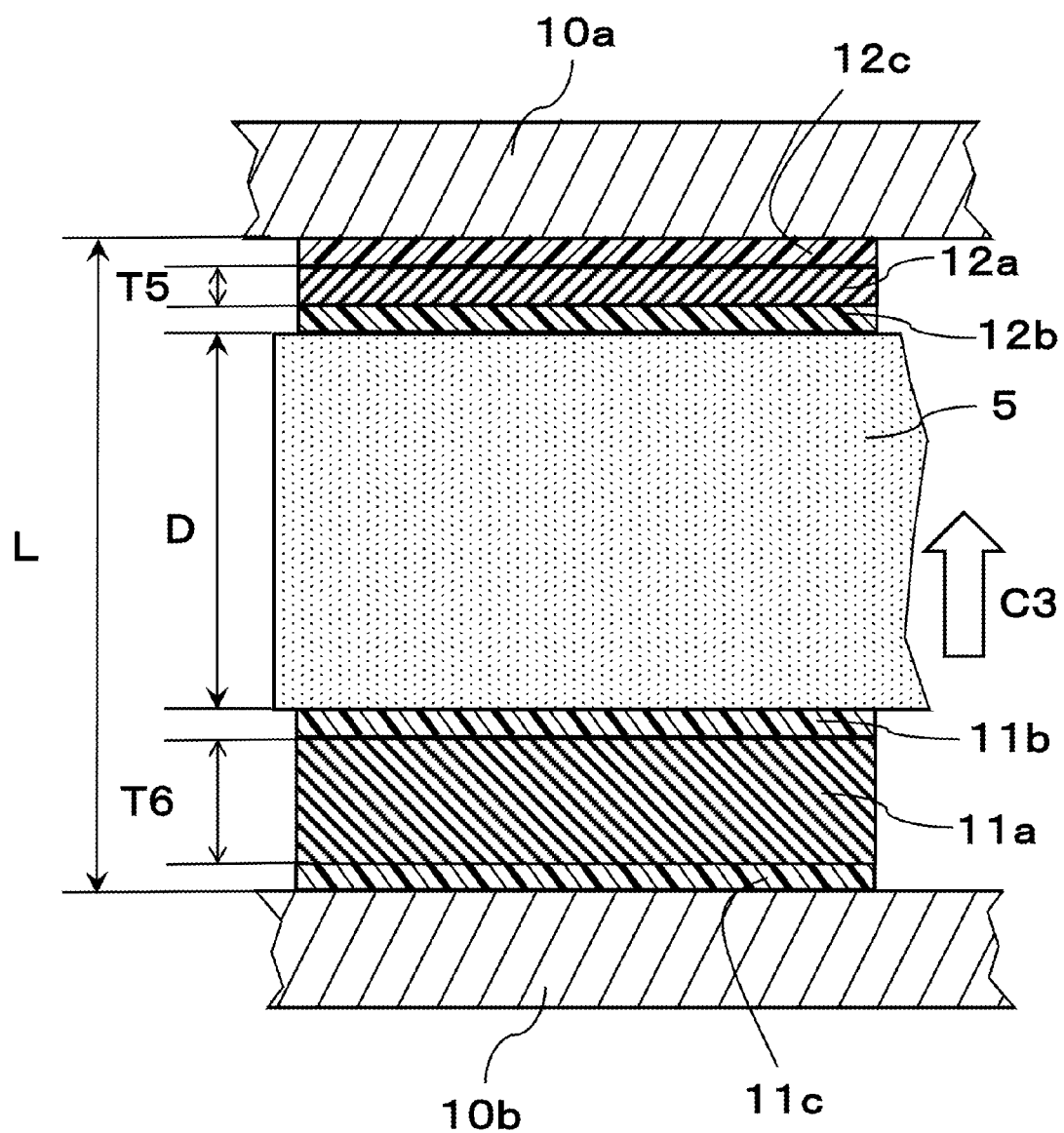
FIG. 9D is a principal part cross-sectional view of a state where external disturbance is applied to the hard disk drive.

It should be noted that a reaction against an impact applied to the PC 1 is applied after the HDD 5 is moved downward, and vibration is applied in the upward direction as shown in FIG. 9D. At that time, because of presence of the double-sided pressure-sensitive adhesive materials 12b, 11b, and 11c having strong pressure-sensitive adhesiveness stronger than the pressure-sensitive adhesive force between the upper buffer material 12a and the upper wall 10a, it is possible to suppress occurrence of a shift in the position of the HDD 5 relative to the upper wall 10a and the partition portion 10b. Therefore, when the lower buffer material 11a is stretched at T6 (T6=T1+ΔT3) by the reaction, the upper buffer material 12a and the upper wall 10a are positioned relative to each other by the pressure-sensitive adhesiveness of the double-sided pressure-sensitive adhesive material 12b and the re-adhesiveness of the double-sided pressure-sensitive adhesive material 12c which are provided on both surfaces of the upper buffer material 12a, and external disturbance C3 caused by the reaction of the lower buffer material 11a is applied to the HDD 5. It should be noted that the external disturbance C3 caused by the reaction is an impact obtained by subtracting the sum of the amount of work taken for the contraction and/or stretching of the upper buffer material 12a and the lower buffer material 11a and the lessened amount of the above initial impact from the external disturbance C2 applied as an acting force to the HDD 5. Thus, the relationship of C2>C3 is met. In addition, with regard to the external disturbance C3 caused by the reaction, the external disturbance C3 applied to the periphery of the HDD 5 (including the upper buffer material 12a and the lower buffer material 11a) becomes an acting force, and vibration is applied in which stretching of the upper buffer material 12a and contraction of the lower buffer material 11a are repeated. While this vibration is repeated, the amplitude of the vibration is decreased because of energy loss caused during stretching and contraction of the upper buffer material 12a and the lower buffer material 11a. In other words, this is a delay impact lessening phenomenon, although details thereof will be described later. It should be noted that the double-sided pressure-sensitive adhesive material 12c has a weak pressure-sensitive adhesive surface and a strong pressure-sensitive adhesive surface on respective surfaces thereof. Thus, the adhesion of the weak pressure-sensitive adhesive surface (at the interface between the double-sided pressure-sensitive adhesive material 12c and the upper wall 10a) is first released by the weight of the HDD 5 and the contraction force of the lower buffer material 11a as described above. When the HDD 5 gets close to the upper wall 10a by the reaction, the double-sided pressure-sensitive adhesive material 12c adheres to the original position of the upper wall 10a on the basis of the re-adhesiveness of the pressure-sensitive adhesive material 12c having the weak pressure-sensitive adhesiveness. In other words, a state where the HDD 5 is positioned relative to the upper wall 10a is kept.

It should be noted that examples of the above-described weak pressure-sensitive adhesive material having the re-adhesiveness are described, for example, in Japanese Laid-Open Patent Publication No. 2001-049211, 2008-280439, and 2011-057810, and are also applicable to the present embodiment in a fundamental idea.

The buffering effect on the external disturbance (C2–C3) in the present embodiment is caused by composite action of the upper buffer material 12a, the lower buffer material 11a, and the double-sided pressure-sensitive adhesive material 12c having the weak pressure-sensitive adhesiveness. In the case where no countermeasure for buffering external disturbance applied to the PC 1 is taken except for the periphery of the HDD 5 (in the case where the upper buffer material 12a, the lower buffer material 11a, and the double-sided pressure-sensitive adhesive material 12c having the weak pressure-sensitive adhesiveness in the present embodiment are not provided), external disturbance applied to the PC 1 is applied as it is, and the HDD 5 is damaged by an impact applied thereto. On the other hand, in the case where the upper buffer material 12a and the lower buffer material 11a are disposed, lessening of external disturbance applied to the HDD 5 can be divided into initial impact lessening and delay impact lessening subsequent to the initial impact lessening. That is, when external disturbance is plotted as impact acceleration (G) against elapsed time, the initial impact lessening is dependent on a rising gradient and a peak value of the external disturbance, and the delay impact lessening is dependent on an integral quantity of the impact acceleration relative to time change. It has been found that the impact lessening performance of the upper buffer material 12a and the lower buffer material 11a is effective for the delay impact lessening but less contributes to the initial impact lessening. Since the double-sided pressure-sensitive adhesive material 12c, which bonds the upper buffer material 12a and the upper wall 10a together, is configured to have weak pressure-sensitive adhesiveness on a single surface thereof in the present embodiment, the lessening of the external disturbance can be divided into a peak of the initial impact lessening occurring at an short elapsed time and a peak of the delay impact lessening subsequent to the peak of the initial impact lessening which peak occurs at a long elapsed time, in terms of the relationship between the impact acceleration and the elapsed time described above. The peak height of the initial impact lessening can be controlled by adjusting the re-adhesive force in re-adhering and/or a force at start of detachment against the weak pressure-sensitive adhesiveness between the upper buffer material 12a and the upper wall 10a. In addition, the amplitude and/or the length of the time of the delay impact lessening is determined by the lessening performance of the upper buffer material 12a and the lower buffer material 11a, and the delay impact lessening can be controlled by the materials and the adhesive areas of these buffer materials.

The case where detachment occurs at the interface between the double-sided pressure-sensitive adhesive material 12c and the upper wall 10a has been described in the present embodiment. However, even in the case where detachment occurs at the interface between the double-sided pressure-sensitive adhesive material 12c and the upper buffer material 12a, the same advantageous effects are obtained. Any of these cases is appropriately selected and applicable. It should be noted that if a weak pressure-sensitive adhesive material is applied onto both the front and reverse surface of the double-sided pressure-sensitive adhesive material 12c, an unwanted wrinkle or the like occurs in the double-sided pressure-sensitive adhesive material 12c by, for example, partial detachment on the upper wall 10a side and partial detachment on the upper buffer material 12a side. Thus, the double-sided pressure-sensitive adhesive material 12c has weak pressure-sensitive adhesiveness on only either one of the front and reverse surfaces thereof. In addition, with regard to the weak pressure-sensitive adhesiveness that allows for detachment at the buffer limit length F, the configuration at the interface between the upper buffer material 12a and the upper wall 10a is able to improve handleability of the upper buffer material 12a.

Figure 10:
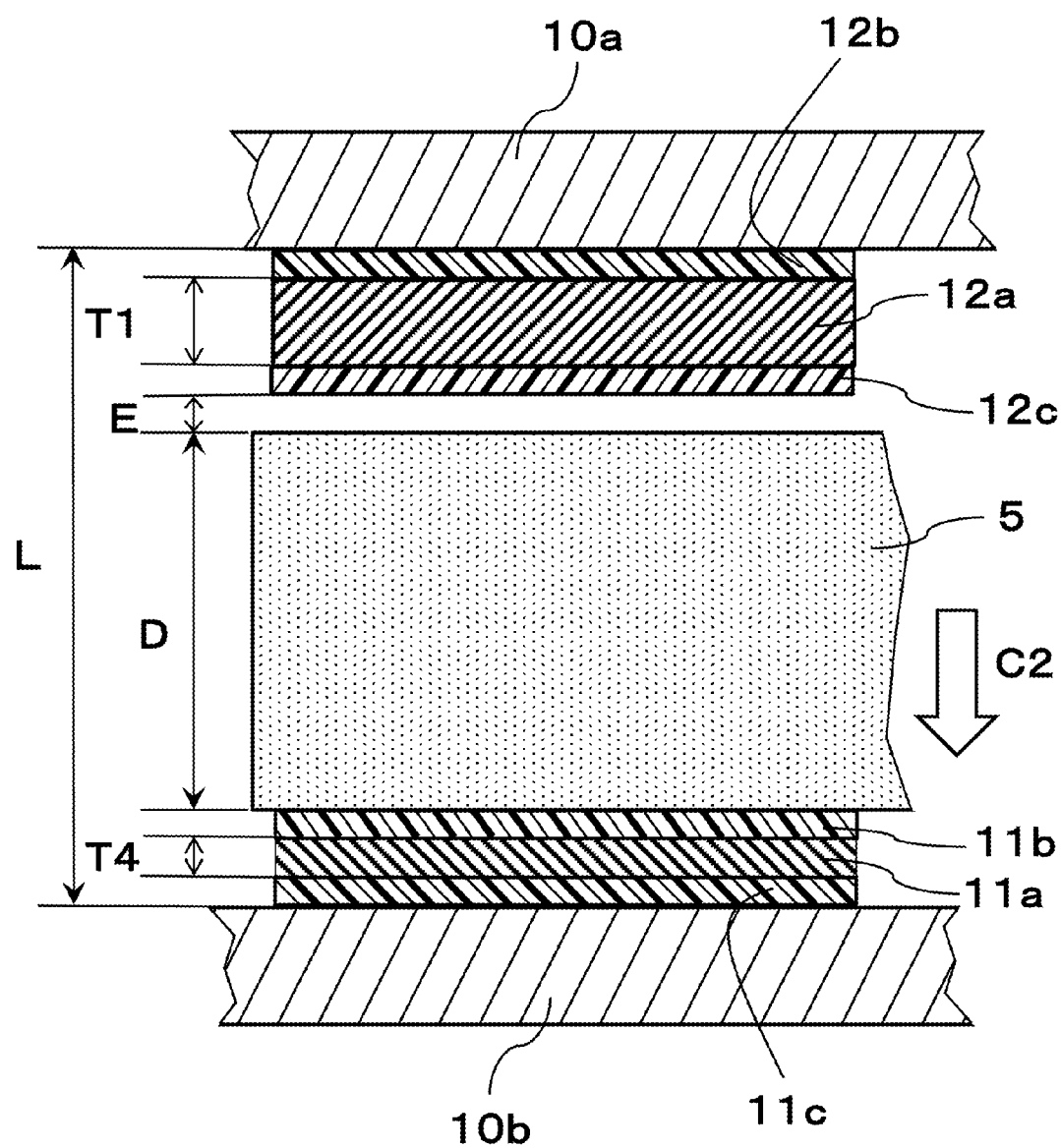
FIG. 10 is a principal part cross-sectional view of a state where external disturbance is applied to another hard disk drive.

In addition, in the present embodiment, the example has been described in which the double-sided pressure-sensitive adhesive material 12c having the weak pressure-sensitive adhesiveness is disposed between the upper wall 10a and the upper buffer material 12a. However, the present embodiment is not limited to the example, and, for example, the double-sided pressure-sensitive adhesive material 12c having the weak pressure-sensitive adhesiveness may be disposed between the upper buffer material 12a and the HDD 5. As an example, FIG. 10 shows a case where weak pressure-sensitive adhesiveness is provided at the interface between the double-sided pressure-sensitive adhesive material 12c and the HDD 5. It should be noted that FIG. 10 shows a state at the instant when external disturbance C2 causing a thickness change of the upper buffer material 12a to exceed the buffer limit length F is applied to the HDD 5. The difference from FIG. 9C is that a detached surface is the interface between the upper buffer material 12a and the HDD 5. In addition, FIG. 10 shows the example where detachment occurs at the interface between the double-sided pressure-sensitive adhesive material 12c and the HDD 5, but even with a configuration in which detachment occurs at the interface between the double-sided pressure-sensitive adhesive material 12c and the upper buffer material 12a, the functions are the same although there is a minor problem in terms of the handleability described above.

It should be noted that in the present embodiment, the double-sided pressure-sensitive adhesive materials 12b, 12c, 11b, and 11c are disposed on both surfaces of the upper buffer material 12a and the lower buffer material 11a, respectively. The present embodiment is not limited thereto, and a configuration is also applicable in which the upper buffer material 12a has weak pressure-sensitive adhesiveness on only one surface thereof (e.g., the double-sided pressure-sensitive adhesive material 12c in the present embodiment is replaced with a pressure-sensitive adhesive material) and pressure-sensitive adhesive materials having strong pressure-sensitive adhesiveness are disposed on the other surfaces, namely, base materials of the double-sided pressure-sensitive adhesive materials 12b, 12c, 11b, and 11c are removed.

In addition, in the present embodiment, the thicknesses and the areas of the upper buffer material 12a and the lower buffer material 11a are the same. However, a configuration is also applicable in which either the thicknesses or the areas of the upper buffer material 12a and the lower buffer material 11a are changed. For example, when either the thicknesses or the areas of the upper buffer material 12a and the lower buffer material 11a are changed and the same material is used for the upper buffer material 12a and the lower buffer material 11a, it is possible to make the buffering effect of the upper buffer material 12a lower than the buffering effect of the lower buffer material 11a by making at least either the thickness or the area of the upper buffer material 12a smaller than that of the lower buffer material 11a. Furthermore, the materials used for the upper buffer material 12a and the lower buffer material 11a may be changed. In this case, the buffering ability of the upper buffer material 12a is made lower than that of the lower buffer material 11a.

It should be noted that examples of materials that can be used for the upper buffer material 12a and the lower buffer material 11a include expanded bodies obtained by expanding urethane, ethylene-propylene rubber, fluorocarbon rubber, polyethylene, and the like.

In addition, each of the exemplified materials is made of a single material, but, for example, a composite buffer material of an impact absorbing part and a vibration damping part disclosed in Japanese Laid-Open Patent Publication No. 2009-264483, and a composite buffer material which is disclosed in Japanese Laid-Open Patent Publication No. 2004-315087 or 2008-291986 and in which a cut end surface of a plate-like member is buried in a flexible material, etc. can be used for the upper buffer material 12a and the lower buffer material 11a in the present embodiment.

In addition, as a method for changing the materials used for the upper buffer material 12a and the lower buffer material 11a, the buffering performance of the upper buffer material 12a may be made lower than that of the lower buffer material 11a. For example, there are a method of making the expansion ratio of the upper buffer material 12a lower than that of the lower buffer material 11a to produce a difference in hardness per unit volume therebetween, and a method of making the expansion density of the lower buffer material 11a higher than that of the upper buffer material 12a.

It should be noted that examples of pressure-sensitive adhesive materials used for the double-sided pressure-sensitive adhesive material 12c and the double-sided pressure-sensitive adhesive material 12b include acrylic type, rubber type, polyester type, and urethane type. In the present embodiment, acrylic type adhesive materials are used as materials of the same type that are used on the front and reverse surfaces of the base material and have different pressure-sensitive adhesiveness. Each of the strong pressure-sensitive adhesiveness and the weak pressure-sensitive adhesiveness on the double-sided pressure-sensitive adhesive material 12c is evaluated, for example, as a peel pressure-sensitive adhesive force in N/cm with a stainless plate as an adherend. In addition, as the base material of each double-sided pressure-sensitive adhesive material, for example, a non-woven fabric, a polyethylene terephthalate film, and the like can be used solely or in combination.

In addition, in the present embodiment, a portion of the lower buffer configuration 11 (specifically, the lower buffer material 11a) is disposed near the reverse surface 4b of the operation housing 4 (see FIG. 1), a portion of the upper buffer configuration 12 (specifically, the upper buffer material 12a) is disposed near the front surface 4a of the operation housing 4, and the HDD 5 is disposed between the lower buffer material 11a and the upper buffer material 12a. In other words, as shown in FIG. 8, the lower buffer material 11a retains the HDD 5 in the gap with the upper buffer material 12a, and various components for operating the PC 1 (a circuit board, an adapter terminal, a signal terminal, an antenna, an optical disk drive, etc.) are disposed in the gap in which the HDD 5 is disposed. With this configuration, it is possible to decrease the thickness of the operation housing 4 in the direction from the front surface 4a to the reverse surface 4b while avoiding, for example, influence of external disturbance to the HDD 5.

In light of the contents described above, a PC 1 configured as shown in FIG. 11 is considered. In the present embodiment, the configuration of the display housing 2 and the configuration of the operation housing 4 except for the storage part in the intermediate housing 10 are the same as those in the embodiment described above. In addition, the configuration of the intermediate housing 10 is the configuration described with reference to FIG. 7, and the configurations of the lateral buffer materials 13 and the HDD 5 stored in the storage part provided in the intermediate housing 10 are also the same as those in the embodiment described above. It should be noted that in order that the lateral buffer materials 13 do not influence an impact applied in the up-down direction of the HDD 5, the lateral buffer materials 13 and the HDD 5 are fixed to each other by an acrylic type strong pressure-sensitive adhesive material, and polyacetal resin thin plates having excellent slidability are interposed between the lateral walls 10c and 10d and the lateral buffer materials 13. As the lower buffer configuration 11, an expanded urethane sheet having a thickness of 8 mm, a width of 25 mm, and a length of 25 mm is disposed near the lower periphery of the HDD 5. It should be noted that physical properties of the expanded urethane sheet used as the lower buffer configuration 11 are a density of 60 kg/m$^3$, a tensile strength of 250 KPa, and an elongation of 150%. A double-sided pressure-sensitive adhesive tape having an acrylic type pressure-sensitive adhesive material with a strong pressure-sensitive adhesive force of 15 N/20 mm relative to a stainless plate on both surfaces of a polyethylene terephthalate film having a thickness of 0.05 mm as a base material is disposed between the lower buffer configuration 11 and the HDD 5 and between the lower buffer configuration 11 and the partition portion 10b. As an upper buffer configuration 14, an expanded urethane sheet having a thickness of 2 mm, a width (in the left-right direction of the sheet of FIG. 11) of 15 mm, and a length (in the up-down direction of the sheet of FIG. 11) of 10 mm is disposed near the upper periphery of the HDD 5. Physical properties of the expanded urethane sheet used as the upper buffer configuration 14 are a density of 330 kg/m$^3$, a tensile strength of 235 KPa, and an elongation of 135%. A pressure-sensitive adhesive material having strong pressure-sensitive adhesiveness is disposed between the upper buffer configuration 14 and the HDD 5. A pressure-sensitive adhesive material having weak pressure-sensitive adhesiveness is disposed between the upper buffer configuration 14 and the upper wall 10a. As the pressure-sensitive adhesive material having strong pressure-sensitive adhesiveness, the acrylic type pressure-sensitive adhesive material described above is used, and as the pressure-sensitive adhesive material having weak pressure-sensitive adhesiveness, an acrylic type pressure-sensitive adhesive material having a weak pressure-sensitive adhesive force of 2.9 N/20 mm relative to a stainless plate is used. It should be noted that as the base material of the double-sided pressure-sensitive adhesive tape having a strong pressure-sensitive adhesive force and a weak pressure-sensitive adhesive force, the above-described polyethylene terephthalate film having a thickness 0.05 mm is used.

Figure 11:
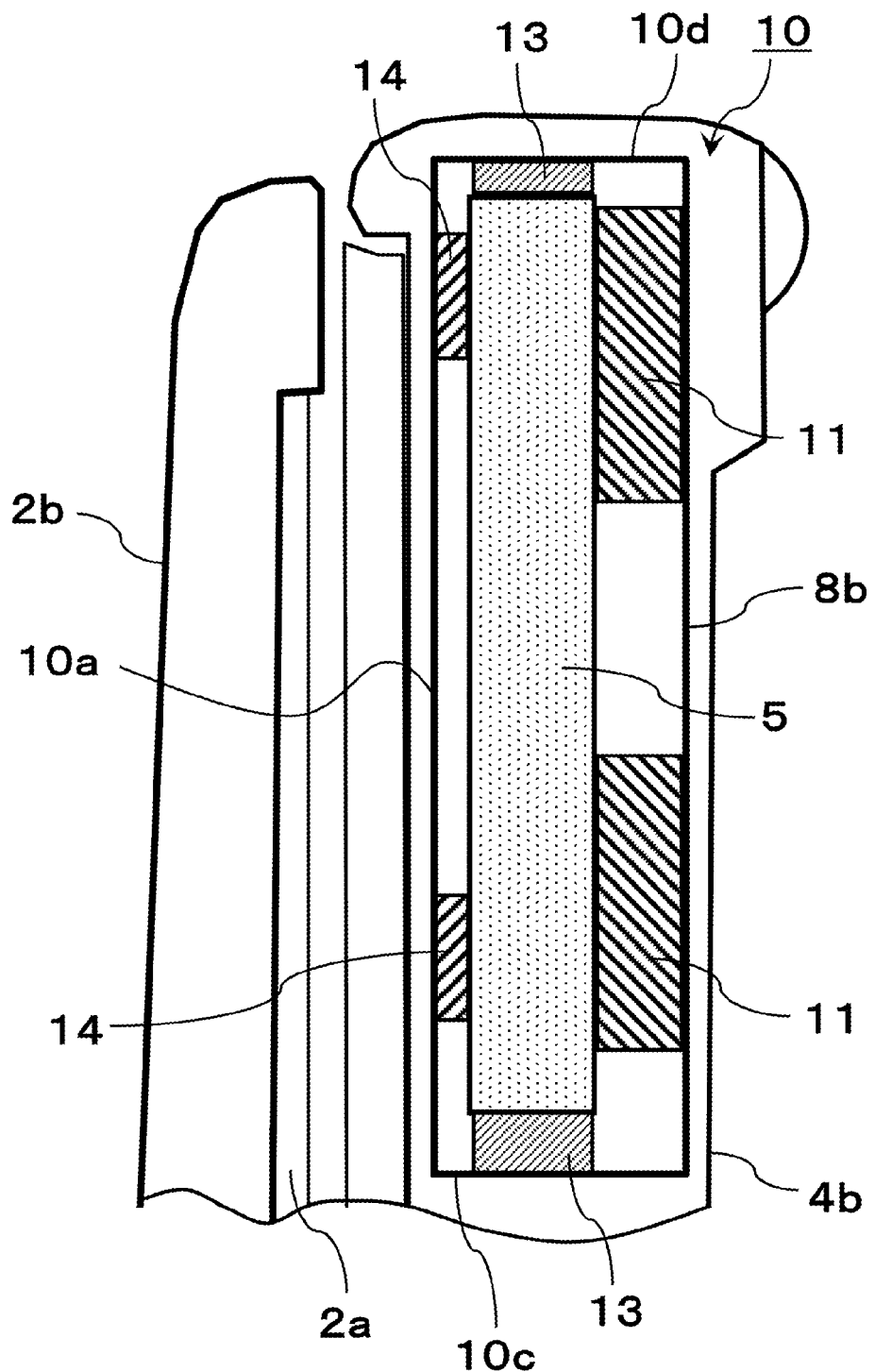
FIG. 11 is a principal part cross-sectional view of another personal computer.

The PC 1 configured thus as shown in FIG. 11 was closed as shown in FIG. 2, was placed on a drop tester so as to extend in the horizontal direction, and was caused to free-fall from a height of 75 cm in the direction of the reverse surface 4b using the drop tester. It should be noted that in order to analyze a state of impact lessening around the HDD 5 in the drop test, a high-speed camera and the PC 1 were caused to free-fall using the drop tester, and then an image recorded by a video camera was visually checked. As a result, the behavior shown in FIGS. 9A to 9D was recognized, and it was also recognized that the operation of the HDD 5 after the drop was normal.

As described above, in the present embodiment, the weak pressure-sensitive adhesive material is used as the pressure-sensitive adhesive material for positioning the upper side in the gravity applied direction when an applied impact is lessened. However, as lateral buffer materials such as the buffer materials 13 in FIG. 8 and the like, for example, a weak pressure-sensitive adhesive material may be used in a direction in which a head sliding on a magnetic disk surface is easily retracted.

Examples of the electronic device to be protected against an impact include, in addition to the above-described hard disk drive, an optical disk drive, a camera which captures a still image and a moving image, and an antenna which transmits and receives signals to and from an external apparatus via radio waves.

Each of the upper buffer configurations 12 and 14 is an example of a first buffer member, and each of the buffer materials 7 and the lower buffer configuration 11 is an example of a second buffer member. In addition, the storage part provided in the intermediate housing 10 is an example of a storage part.

As presented above, the embodiments have been described as examples of the technology according to the present disclosure. For this purpose, the accompanying drawings and the detailed description are provided.

Therefore, components in the accompanying drawings and the detail description may include not only components essential for solving problems, but also components that are provided to illustrate the above described technology and are not essential for solving problems. Therefore, such inessential components should not be readily construed as being essential based on the fact that such inessential components are shown in the accompanying drawings or mentioned in the detailed description.

Further, the above described embodiments have been described to exemplify the technology according to the present disclosure, and therefore, various modifications, replacements, additions, and omissions may be made within the scope of the claims and the scope of the equivalents thereof.

What is claimed is:

1. An electronic apparatus comprising:
    a housing;
    a component disposed within the housing;
    a first buffer member disposed between a first surface of an inside of the housing and the component;
    a second surface, of the inside of the housing, opposed to the first surface across the component;
    a pressure-sensitive adhesive material disposed between the component and the second surface for positioning the component and the second surface, and
    wherein a bonding between the pressure-sensitive adhesive material and the component or a bonding between the pressure-sensitive adhesive material and the second surface is broken when the first buffer member contracts such that a thickness of the first buffer member becomes a post-contraction length (T4) from a natural length (T1) ((T1)>(T4)).

2. The electronic apparatus according to claim 1, further comprising a second buffer member interposed between the component and the second surface, wherein
    at least either the second surface and the second buffer member or the second buffer member and the component are fixed to each other by the pressure-sensitive adhesive material.

3. The electronic apparatus according to claim 2, wherein the component and the first buffer member, and the first buffer member and the first surface, are fixed to each other more firmly than by pressure-sensitive adhesiveness of the pressure-sensitive adhesive material.

4. The electronic apparatus according to claim 3, wherein a buffer limit length F of the second buffer member in a stretching direction from a natural length of the second buffer member is shorter than a buffer enable length ((T1)−(T4)) of the first buffer member in a stretching direction from a natural length of the first buffer member.

5. The electronic apparatus according to claim 3, wherein
    the second surface and the second buffer member are fixed to each other by the pressure-sensitive adhesive material, and
    the second buffer member and the component are fixed to each other more firmly than by the pressure-sensitive adhesiveness of the pressure-sensitive adhesive material.

6. The electronic apparatus according to claim 2, wherein the first buffer member is formed so as to have a hardness lower than that of the second buffer member.

7. The electronic apparatus according to claim 2, wherein
each of the first buffer member and the second buffer member has a plate shape with a predetermined thickness, and
the first buffer member is formed so as to have a thickness smaller than that of the second buffer member.

8. The electronic apparatus according to claim 2, wherein a center of gravity of the electronic apparatus is located closer to the first surface than to the second surface.

9. The electronic apparatus according to claim 2, wherein
the electronic apparatus is placed on a flat surface when being used, and
the second surface is located above the first surface in the used state.

10. The electronic apparatus according to claim 2, wherein a portion of the first buffer member is located at a position where the portion of the first buffer member faces a portion of the second buffer member across the electronic apparatus.

11. The electronic apparatus according to claim 1, wherein the pressure-sensitive adhesive material has re-adhesiveness.

* * * * *